(12) United States Patent
Asahi

(10) Patent No.: US 9,674,264 B2
(45) Date of Patent: Jun. 6, 2017

(54) REMOTE CONTROL SYSTEM, REMOTE CONTROL METHOD, COMMUNICATION DEVICE, AND PROGRAM

(71) Applicant: NTT DOCOMO, INC., Tokyo (JP)

(72) Inventor: Yuuki Asahi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 320 days.

(21) Appl. No.: 14/362,634

(22) PCT Filed: Mar. 11, 2013

(86) PCT No.: PCT/JP2013/056630
§ 371 (c)(1),
(2) Date: Jun. 4, 2014

(87) PCT Pub. No.: WO2013/137191
PCT Pub. Date: Sep. 19, 2013

(65) Prior Publication Data
US 2015/0058740 A1 Feb. 26, 2015

(30) Foreign Application Priority Data
Mar. 12, 2012 (JP) .................. 2012-054785

(51) Int. Cl.
*H04L 29/08* (2006.01)
*G08C 17/02* (2006.01)
(Continued)

(52) U.S. Cl.
CPC .......... *H04L 67/025* (2013.01); *G06F 3/0482* (2013.01); *G06F 3/04842* (2013.01); *G08C 17/02* (2013.01); *G08C 2201/40* (2013.01)

(58) Field of Classification Search
CPC ....... H04L 29/08; G06F 3/0484; G06F 3/0482
See application file for complete search history.

(56) References Cited

U.S. PATENT DOCUMENTS

2009/0190914 A1* 7/2009 Scott ................. G03B 17/24
396/311
2009/0285443 A1* 11/2009 Camp, Jr. ............. G08C 23/04
382/100

(Continued)

FOREIGN PATENT DOCUMENTS

JP     2011-209965 A    10/2011

OTHER PUBLICATIONS

PCT International Search Report issued in International Application No. PCT/JP2013/056630, date mailed Apr. 9, 2013, pp. 1-2.

*Primary Examiner* — David Choi
(74) *Attorney, Agent, or Firm* — MKG, LLC

(57) ABSTRACT

A remote control system including a relay device capable of moving around a space where an appliance to be controlled is installed, and a communication device that is operated by a user, and communicates with the relay device. The relay device is controlled by the communication device, and includes an imaging unit, a sending unit that sends a captured image to the communication device, and a sending unit that wirelessly sends an instruction signal to the appliance to be controlled. The communication device includes a storage unit that stores data on an image of the space captured in advance, data on a partial area included in the image, and data on at least one of a request for movement to a destination and a request for transmission of an instruction signal, in association with each other.

8 Claims, 17 Drawing Sheets

(51) Int. Cl.
*G06F 3/0482* (2013.01)
*G06F 3/0484* (2013.01)

(56) References Cited

U.S. PATENT DOCUMENTS

| | | | | |
|---|---|---|---|---|
| 2009/0319904 | A1* | 12/2009 | Rensin | H04L 29/06027 715/733 |
| 2010/0182445 | A1* | 7/2010 | Chiang | G06F 1/3203 348/222.1 |
| 2010/0321534 | A1* | 12/2010 | Kim | G06T 7/0083 348/239 |
| 2011/0093799 | A1* | 4/2011 | Hatambeiki | G08C 17/02 715/763 |
| 2012/0210023 | A1* | 8/2012 | Ozaki | G06F 1/266 710/16 |
| 2013/0043797 | A1* | 2/2013 | Huang | H05B 37/029 315/158 |
| 2015/0058740 | A1* | 2/2015 | Asahi | G08C 17/02 715/740 |

* cited by examiner

| MODEL NUMBER | MANUFACTURER | APPLIANCE TYPE | SIGNAL TYPE | COMMAND NAME | INSTRUCTION SIGNAL |
|---|---|---|---|---|---|
| X-001 | X | TV RECEIVER | INFRARED | POWER ON/OFF | AAA.. |
| X-001 | X | TV RECEIVER | INFRARED | VOLUME UP | BBB.. |
| X-001 | X | TV RECEIVER | INFRARED | VOLUME DOWN | CCC.. |
| ⋮ | ⋮ | ⋮ | ⋮ | ⋮ | ⋮ |
| Y-001 | Y | AIR-CONDITIONER | BLUETOOTH | POWER ON/OFF | DDD.. |
| Y-001 | Y | AIR-CONDITIONER | BLUETOOTH | TEMPERATURE SETTING UP | EEE.. |
| Y-001 | Y | AIR-CONDITIONER | BLUETOOTH | TEMPERATURE SETTING DOWN | FFF.. |
| ⋮ | ⋮ | ⋮ | ⋮ | ⋮ | ⋮ |

FIG. 7

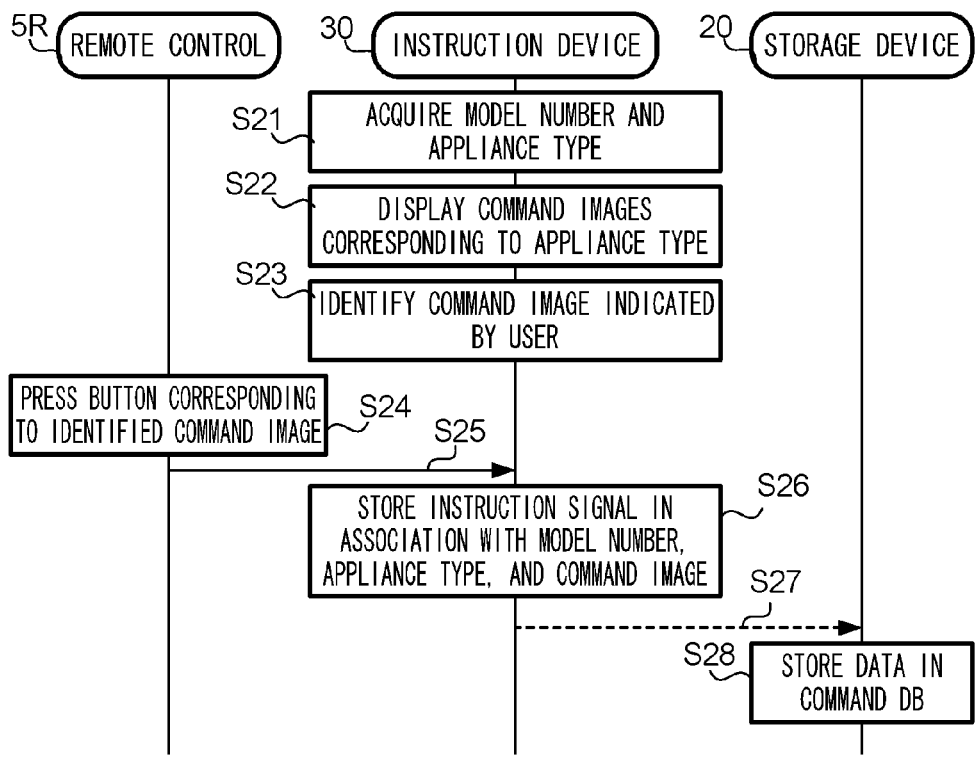

FIG. 8

| No. | ID | REGISTERED MODEL NO. | SHORTCUT ASSOCIATED | MOTION DATA (MOTION NO.) | COMMAND DATA (COMMAND NO.) | SHORTCUT AREA |
|---|---|---|---|---|---|---|
| 1 | 0001 | X-001 | MOTION 1 | MOVE TO TV FRONT (1) | — | CAPTURED IMAGE C0 (x1,y1)(v1,w1) |
| 2 | 0001 | X-001 | COMMAND 1 | — | TV POWER ON/OFF (1) | CAPTURED IMAGE C3 (x2,y2)(v2,w2) |
| 3 | 0001 | X-001 | COMMAND 2 | — | TV VOLUME UP (2) | CAPTURED IMAGE C3 (x3,y3)(v3,w3) |
| 4 | 0001 | X-001 | COMMAND 3 | — | TV VOLUME DOWN (3) | CAPTURED IMAGE C3 (x4,y4)(v4,w4) |
| 5 | 0001 | X-001 | COMMAND 4 | — | SELECT CHANNEL 1 (4) | CAPTURED IMAGEC3 (x5,y5)(v5,w5) |
| 6 | 0002 | X-001 | COMMAND 5 | — | SELECT CHANNEL 2 (5) | CAPTURED IMAGEC3 (x6,y6)(v6,w6) |
| ⋮ | ⋮ | ⋮ | ⋮ | ⋮ | ⋮ | ⋮ |

*FIG. 23A*

| No. | ID | REGISTERED MODEL NO. | SHORTCUT ASSOCIATED | MOTION DATA (MOTION NO.) | COMMAND DATA (COMMAND NO.) | SHORTCUT AREA |
|---|---|---|---|---|---|---|
| ⋮ | ⋮ | ⋮ | ⋮ | ⋮ | ⋮ | ⋮ |
| 21 | 0001 | Y-001 | MOTION 2 | MOVE TO A/C FRONT (2) | – | CAPTURED IMAGE C0 (x9, y9) (v9, w9) |
| ⋮ | ⋮ | ⋮ | ⋮ | ⋮ | ⋮ | ⋮ |
| 40 | 0001 | Y-001 | COMMAND 18 | – | AIR VOLUME DOWN (18) | CAPTURED IMAGE C5 (x9, y9) (v9, w9) |
| 41 | 0002 | X-001 | MOTION 1 | MOVE TO TV FRONT (1) | – | CAPTURED IMAGE C0 (x1, y1) (v1, w1) |
| 42 | 0002 | X-001 | COMMAND 4 | – | SELECT CHANNEL 1 (4) | CAPTURED IMAGE C3 (x5, y5) (v5, w5) |
| 43 | 0002 | X-001 | COMMAND 5 | – | SELECT CHANNEL 2 (5) | CAPTURED IMAGE C3 (x6, y6) (v6, w6) |
| ⋮ | ⋮ | ⋮ | ⋮ | ⋮ | ⋮ | ⋮ |
| 50 | 0002 | X-001 | COMMAND 13 | – | SELECT CHANNEL 10 (13) | CAPTURED IMAGE C3 (x7, y7) (v7, w7) |

FIG. 23B

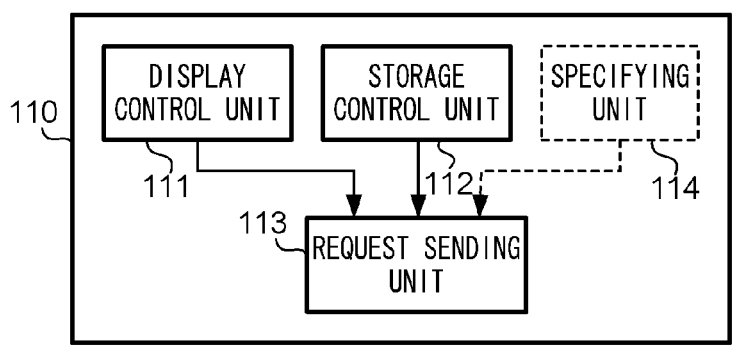

FIG. 24

REMOTE CONTROL SYSTEM, REMOTE CONTROL METHOD, COMMUNICATION DEVICE, AND PROGRAM

TECHNICAL FIELD

The present invention relates to a technique for remotely providing an operational instruction to an appliance.

BACKGROUND ART

Known in the art is a technique for providing an operational instruction to an appliance such as a TV or an air-conditioner. In JP2011-209965A1, a technique is described whereby an appliance to be operated is recognized based on an image of the appliance taken by a camera, and an operation image for operating the recognized appliance to be operated (hereinafter, referred to simply as the "appliance") is shown on a display, by use of which a user sends a command to the appliance to be operated.

Before a user located outside a room remotely provides operational instructions to different appliances installed inside the room, s/he may first wish to confirm a situation inside the room. For example, a user may wish to provide an instruction to turn on an air-conditioner or change temperature settings thereof after confirming how much sunlight is coming into a room, or a condition of a pet. By the technique described in JP2011-209965A1, a user located inside a room is able to take an image of an appliance to be controlled, which is installed inside the room, and to operate the appliance; however, a remote user is not able to do so.

An appliance to be controlled may be one of various types of appliances such as an air-conditioner, a TV, and a light, which may be installed in various locations within a room. In a case where the appliances are operated by use of a remote control device installed at a place in a room, an appliance, depending on its location, may be prevented from receiving a remote control signal sent by the remote control device due to furniture or another object placed such that the signal is obstructed. In such a case, remote control devices need to be installed at different locations in the room so that a signal can reach any appliance.

It is an object of the present invention to enable a user to operate remotely plural appliances installed in different locations in a room after confirming a situation relating to each appliance.

SUMMARY

The present invention provides a remote control system, comprising: a relay device capable of moving around a space where an appliance to be controlled is installed; and a communication device that is operated by a user, and communicates with the relay device, wherein: the relay device includes: a movement control unit that controls movement of the relay device according to a request from communication device; an imaging unit that captures an image; a first sending unit that sends an image captured by the imaging unit to the communication device; and a second sending unit that wirelessly sends, according to a request from the communication device, an instruction signal to instruct the appliance to be controlled to perform an operation; and the communication device includes: a storage unit that stores data on an image of the space captured in advance, data on an image area included in the image, and data on at least one of a first request that requests the relay device to move to a destination located in the space, and a second request that requests the relay device to send the instruction signal, in association with each other; a display unit that displays the image sent from the first sending unit on a display surface; a detecting unit that detects a position indicated by the user on the display surface; and a sending unit that in a case where an image displayed on the display surface when the position is detected by the detecting unit is the image stored in the storage unit, and the detected position is included in the image area associated with the stored image, sends, to the relay device, the first or second request stored in the storage unit in association with the image area.

In a preferred aspect, the remote control system further comprises a database, the communication device further includes a notifying unit that provides a notification of an identifier that identifies the communication device or a user of the communication device, the database stores plural sets of data on an identifier, data on a destination, and data on an instruction signal, and in response to a notification from the communication device of the identifier, notifies the communication device of a destination and an instruction signal, which are associated with the identifier, and the sending unit sends, to the relay device, the first request specifying the destination notified by the database, or the second request specifying the instruction signal notified by the database.

In another preferred aspect, the storage unit stores data on the image area, data on the first request, and data on the second request in association with each other, the sending unit of the communication device sends, to the relay device, the first request and the second request, which are associated with the image area, the movement control unit controls movement of the relay device according to the first request received from the communication device, and the second sending unit, after the control by the movement control unit is performed, sends the instruction signal according to the second request received from the communication device.

In another preferred aspect, the storage unit stores data on the image area, data on the first request, and data on the second request in association with each other, the second request being a request that asks the second sending unit to send an instruction signal, which is defined for each of a plurality of ranges of distance, the communication device further includes an identifying unit that identifies a position of the communication device, the sending unit of the communication device, in a case where a distance between the space and the positioned identified by the identifying unit is not included in the ranges, sends the first request to the relay device, and in a case where the distance is included in one of the ranges, sends, to the relay device, the first request and the second request specifying an instruction signal defined according to the distance, the movement control unit controls movement of the relay device according to the first request received from the communication device, and the second sending unit, after the control by the movement control unit is performed, sends the instruction signal according to the second request received from the communication device.

In another preferred aspect, the remote control system further comprises a specifying unit that specifies at least one of the first request and the second request according to a user's input operation, and the second sending unit sends the first and/or second request specified by the specifying unit to the relay device.

The present invention provides a remote control method, comprising the steps of: capturing an image by a relay device capable of moving around a space where an appliance to be controlled is installed; sending an image of the space by the relay device to a communication device that includes a display unit for displaying an image on a display surface, that is operated by a user, that communicates with the relay device, and that includes a storage unit, wherein the storage unit stores data on an image of the space captured in advance, data on an image area included in the image, and data on at least one of a first request that requests the relay device to move to a destination located in the space, and a second request that requests the relay device to send the instruction signal to instruct the appliance to be controlled to perform an operation, in association with each other; displaying the image received from the relay device on the display surface; detecting a position indicated by the user on the display surface; in a case where an image displayed on the display surface when the indicated position is detected is the image stored in the storage unit, and the detected position is included in the image area associated with the stored image, sending by the communication device to the relay device the first or second request stored in the storage unit in association with the image area; and moving the relay device or wirelessly sending the instruction signal according to the first or second request received from the communication device.

The present invention provides a communication device comprising: a communication unit that communicates with a relay device capable of moving around a space where an appliance to be controlled is installed; a storage unit that stores data on an image of the space captured in advance, data on an image area included in the image, and data on at least one of a first request that requests the relay device to move to a destination located in the space, and a second request that requests the relay device to send the instruction signal to instruct the appliance to be controlled to perform an operation, in association with each other; a display unit that displays the image received by the communication unit on a display surface; a detecting unit that detects a position indicated by a user on the display surface; and a sending unit that in a case where an image displayed on the display surface when the position is detected by the detecting unit is the image stored in the storage unit, and the detected position is included in the image area associated with the stored image, sends, to the relay device, the first or second request stored in the storage unit in association with the image area.

The present invention provides a medium recording a program for causing a computer to execute the steps of: displaying, on a display surface of a display unit, an image received from a relay device capable of moving around a space where an appliance to be controlled is installed; storing, in a storage unit, data on an image of the space captured in advance, data on an image area included in the image, and data on at least one of a first request that requests the relay device to move to a destination located in the space, and a second request that requests the relay device to send an instruction signal, in association with each other; and in a case where an image displayed on the display surface when a position indicated by a user on the display surface is detected is the image stored in the storage unit, and the detected position is included in the image area associated with the stored image, sending, to the relay device, the first or second request stored in the storage unit in association with the image area.

According to the present invention, a user is enabled to operate remotely plural appliances installed in different locations in a room after confirming a situation relating to each appliance

BRIEF DESCRIPTION OF THE DRAWINGS

FIG. 7 is a chart showing data stored in command DB.

FIG. 8 is a sequence chart showing a procedure of a second command storage processing.

FIG. 23A is the first half of a diagram showing a part of data stored in a shortcut DB.

FIG. 23B is the second half of a diagram showing a part of data stored in a shortcut DB.

FIG. 24 is a block diagram showing functions provided by a control unit of a communication device.

DETAILED DESCRIPTION

[First Embodiment]
[Configuration]

The first embodiment of the present invention will be described below with reference to the drawings.

Figure 1:
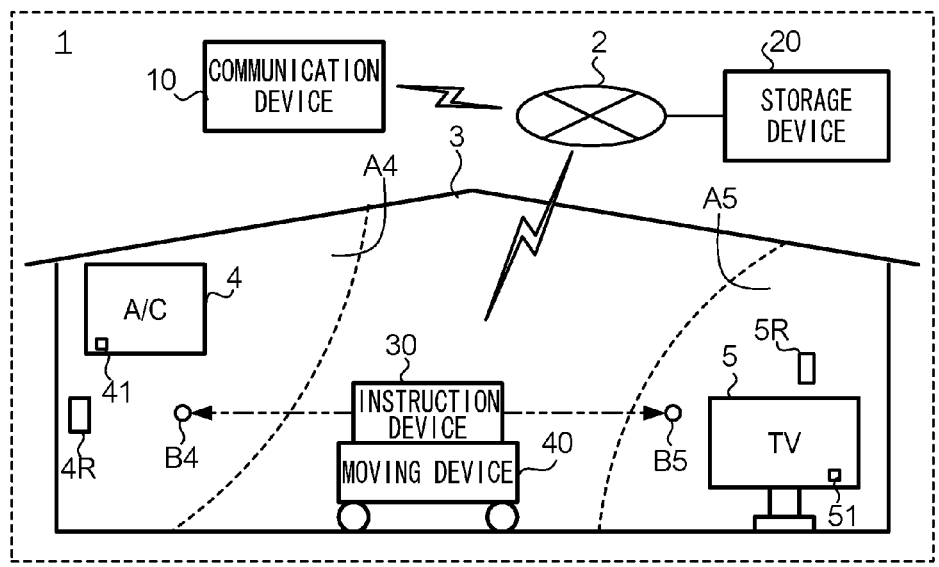
FIG. 1 is a block diagram showing a configuration of a remote instruction system according to a first embodiment.

FIG. 1 is a block diagram showing a configuration of remote instruction system according to the first embodiment. Remote instruction system 1 includes communication device 10, storage device 20, communication line 2, instruction device 30, moving device 40, air-conditioner 4, and TV 5. Storage device 20 and communication line 2 are provided outside room 3 (namely, outdoors) and instruction device 30, moving device 40, air-conditioner 4, and TV 5 are provided inside room 3 (namely, indoors). Communication line 2 includes a network such as a mobile communication network or the Internet. Communication device 10, storage device 20, and instruction device 30 communicate with each other via communication line 2. Communication device 10 is carried by a user. In the present embodiment it is assumed that communication device 10 is located outside room 3 (namely, outdoors), with a user. Remote instruction system 1 is a system whereby a user carrying communication device 10, who is located outdoors, remotely provides an operational instruction to air-conditioner 4 and TV 5. When a user provides the instruction, instruction device 30 and moving device 40 serve as a relay device that relays the user's instruction.

Air-conditioner 4 and TV 5 are appliances to be controlled, and to which an operational instruction is provided by a user, as described above. Air-conditioner 4 is an appliance for controlling a temperature inside room 3 to a set temperature. Air-conditioner 4 performs an operation such as turning power on/off, selecting an air-conditioning type (heating or cooling), or turning up or down of temperature settings. Air-conditioner 4 is instructed to perform such an operation via remote control 4R. Remote control 4R has plural buttons, to each of which a different air-conditioner instruction signal is assigned. The air-conditioner instruction signal is a signal indicating an operation to be performed by air-conditioner 4. In a case that any button is pressed, an air-conditioner instruction signal corresponding to the pressed button is sent by remote control 4R via infrared communication. Air-conditioner 4 includes receiving unit 41 for receiving an infrared communication signal. When receiving unit 41 receives an air-conditioner instruction signal, air-conditioner 4 performs an operation indicated by the signal.

TV 5 is a television receiver that receives a television broadcast and outputs images and sounds. TV 5 performs an operation such as turning power on/off, selecting a channel, or turning up or down the volume. Remote control 5R sends a signal (hereinafter referred to as "TV instruction signal") to instruct TV 5 to perform such an operation, in the same manner as remote control 4R does relative to air-conditioner 4. TV 5 includes receiving unit 51 for receiving an infrared communication signal. When receiving unit 51 receives a TV instruction signal, TV 5 performs an operation indicated by the signal.

Instruction device 30 stores data on the instruction signals described above, and sends an instruction via infrared communication. Namely, instruction device 30 is a device for providing an operational instruction to air-conditioner 4 and TV 5, which are appliances to be controlled. Air-conditioner 4 and TV 5 are instructed to operate, not only by use of remote control 4R and remote control 5R, but also by use of instruction device 30. Instruction device 30 is able to perform infrared communication with an appliance to be controlled, when the device is within five meters of a receiving unit (receiving unit 41 or 51) of the appliance. However, receiving units 41 and 51 are able to receive only a signal that is sent from a direction within a predetermined range. Accordingly, an instruction signal may not reach the receiving units depending on a location of instruction device 30. In FIG. 1, space A4, in which instruction device 30 is able to perform infrared communication with air-conditioner 4, and space A5, in which instruction device 30 is able to perform infrared communication with TV 5, are shown.

Moving device 40 is a device that moves in a space where an appliance to be controlled is installed (namely, indoors).

Moving device 40 includes wheels, a direction of which can be changed. By rotating the wheels and changing a direction of wheels, moving device 40 moves to different locations in the room. Moving device 40 moves according to an instruction provided by instruction device 30. Instruction device 30 performs the instruction by sending a signal (hereinafter referred to as "movement signal") indicative of an operation for moving in a direction, in compliance with the Bluetooth (registered trademark) standard. When moving device 40 receives the movement signal, moving device 40 performs the operation indicated by the signal to move in the indicated direction.

Storage device 20 stores command database (DB) for use in identifying the meaning of an instruction signal provided to an appliance to be controlled. In the command DB, a command name, an instruction signal such as an air-conditioner instruction signal or a TV instruction signal, and a model number of an appliance to be controlled are associated. The command name is a name of an instruction (namely, a command) provided to an appliance to be controlled. The command name is a term indicative of an operation, which an appliance to be controlled is instructed to perform. The model number is a symbol indicative of a model of an appliance to be controlled, which is assigned by a manufacturer of the appliance. Appliances to be controlled that share a model number may be operated by a like instruction signal.

Communication device 10 is, for example, a smartphone or a tablet terminal. Communication device 10 is operated by a user, and communicates with instruction device 30. Communication device 10 sends request data to instruction device 30 via communication line 2, which requests instruction device 30 to send the above-mentioned instruction signal or movement signal. In other words, communication device 10 sends request data to instruction device 30, which requests instruction device 30 to provide an operational instruction to an appliance to be controlled or moving device 40. By sending the request data, communication device 10 requests instruction device 30 to perform an operation (in this case, an operation of sending an instruction signal or a movement signal). Hereinafter, sending request data will be referred to simply as "requesting." For example, communication device 10 requests instruction device 30 to instruct moving device 40 to move so that instruction device 30 reaches position B4 or B5. Position B4 is included in space A4, and position B5 is included in space A5.

In FIG. 1, instruction device 30 is at a position not included in space A4 or A5. However, if instruction device 30 receives request data sent from communication device 10 as a result of the request, and moves according to a request indicated by the received request data, instruction device 30 is enabled to communicate with air-conditioner 4 or TV 5. After the movement, if communication device 10 instructs instruction device 30 to send an air-conditioner instruction signal or a TV instruction signal, air-conditioner 4 or TV 5 performs an operation indicated by the instruction signal. As described in the foregoing, in remote instruction system 1, a user operates communication device 10 to provide remotely an operational instruction to an appliance to be controlled.

Hereinafter, a hardware configuration of each device will be described.

Figure 2:
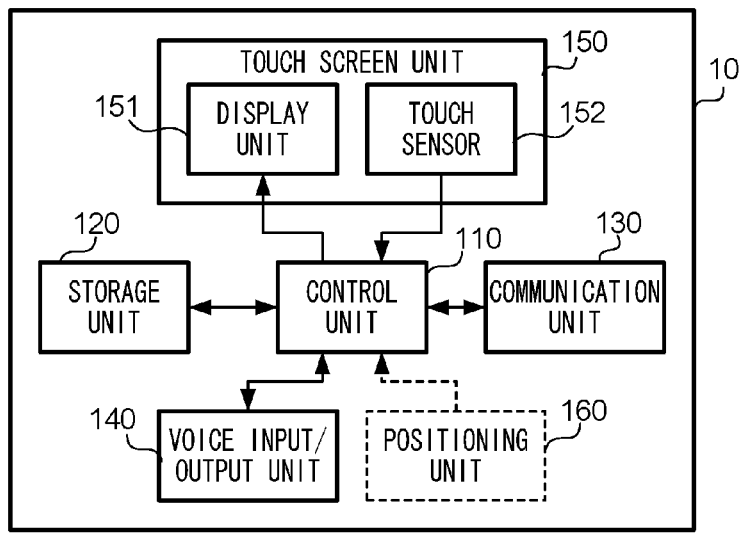
FIG. 2 is a diagram showing a hardware configuration of a communication device.

FIG. 2 is a diagram showing a hardware configuration of communication device 10. Communication device 10 includes control unit 110, storage unit 120, communication unit 130, voice input/output unit 140, and touch screen unit 150. Storage unit 120 is a storage means such as a hard disk, and stores data and programs to be used by control unit 110.

Communication unit 130 is a communication means that wirelessly connects to communication line 2 to communicate with storage device 20 or instruction device 30. Communication unit 130 exchanges data with storage device 20 or instruction device 30 by use of the communication means. Voice input/output unit 140 includes a speaker, a microphone, and a voice processing circuit, and inputs and outputs voice for a telephone call. Control unit 110 is a computer including a processor such as a CPU (Central Processing Unit), and a storage device such as a ROM (Read Only Memory) or a RAM (Random Access Memory). The CPU executes a program stored in a ROM or storage unit 120, while using a RAM as a work area, to control components of communication device 10.

Touch screen unit 150 is a means for displaying an image and receiving an input operation performed by a user, and includes display unit 151 and touch sensor 152. Display unit 151 includes a display surface, on which an image is displayed. Display unit 151 includes a display panel that displays an image on the display surface, using liquid crystal elements or organic EL (electroluminescence) elements, and a drive circuit for driving the display panel. Touch sensor 152 has the same size and shape as the display surface, and is deposited on the display surface. Touch sensor 152 is, for example, a capacitance type sensor that detects a position indicated by a pointer on the display surface based on an electrostatic coupling caused by the pointer. Touch sensor 152 serves as a detecting means for detecting a position on the display surface indicated by a user. Touch sensor 152 provides data indicative of the detected position to control unit 110. In a case where images for input operation are displayed on the display surface, a user performs an input operation by indicating an image. Touch sensor 152 provides input operation data corresponding to an image covering a detected position (namely, input operation data corresponding to a received input operation) to control unit 110.

Figure 3:
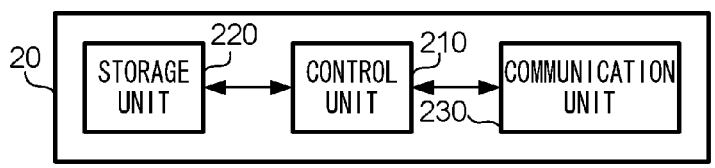
FIG. 3 is a diagram showing a hardware configuration of a storage device.

FIG. 3 is a hardware configuration of storage device 20. Storage device 20 includes control unit 210, storage unit 220, and communication unit 230. Storage unit 220 is a storage means such as a hard disk, and stores data and programs to be used by control unit 210. Storage unit 220 also stores the above command DB. Communication unit 230 is a connecting means for wirelessly connecting to communication line 2 to exchange data with communication device 10 or instruction device 30. Control unit 210 is a computer including a processor such as a CPU, and a storage device such as a ROM or a RAM. The CPU executes a program stored in a ROM or storage unit 220, while using a RAM as a work area, to control components of storage device 20.

Figure 4:
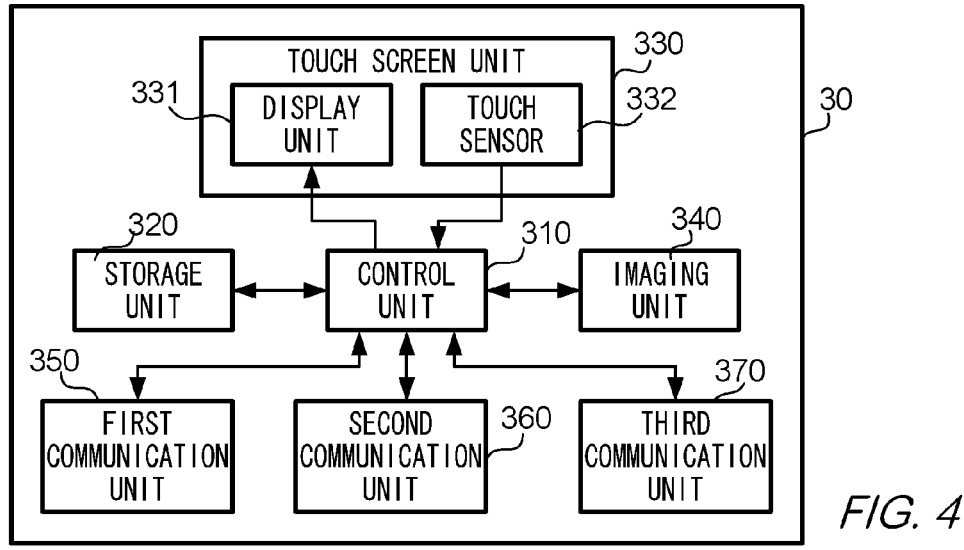
FIG. 4 is a diagram showing a hardware configuration of an instruction device.

FIG. 4 is a hardware configuration of instruction device 30. Instruction device 30 includes control unit 310, storage unit 320, touch screen unit 330, imaging unit 340, first communication unit 350, second communication unit 360, and third communication unit 370. Storage unit 320 is a storage means such as a hard disk, and stores data and programs to be used by control unit 310. Control unit 310 is a computer including a processor such as a CPU, and a storage device such as a ROM or a RAM. The CPU executes a program stored in a ROM or storage unit 320, while using a RAM as a work area, to control components of instruction device 30. Touch screen unit 330 includes display unit 331 and touch sensor 332. Touch screen unit 330, display unit 331, and display unit 331 have the same configuration as touch screen unit 150, display unit 151, and touch sensor 152, respectively.

Imaging unit 340 functions as, for example, a digital camera. Imaging unit 340 is an imaging means that captures an image. Imaging unit 340 provides image data indicative of a captured image to control unit 310. First communication unit 350 is a connecting means for wirelessly connecting to communication line 2 to exchange data with communication device 10 or storage device 20. First communication unit 350 receives the image data from control unit 310. First communication unit 350, by sending the image to communication device 10, serves as an image sending means for sending an image captured by imaging unit 340 to communication device 10. Second communication unit 360 sends an infrared communication signal to communicate with the above-mentioned appliance to be controlled. Second communication unit 360 serves as a signal sending means for wirelessly sending the above-mentioned air-conditioner instruction signal or TV instruction signal according to the above-mentioned request from communication device 10. The request herein is a request to second communication unit 360. Third communication unit 370 sends a signal complying with the Bluetooth standard, as in the case of the above-mentioned movement signal, to communicate with moving device 40.

Figure 5:
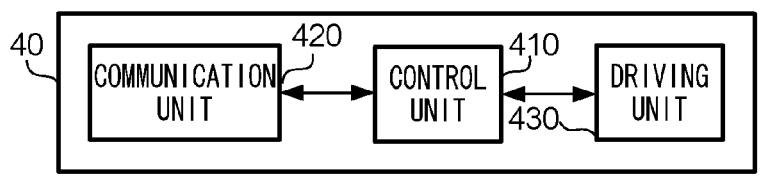
FIG. 5 is a diagram showing a hardware configuration of a moving device.

FIG. 5 is a diagram showing a hardware configuration of moving device 40. Moving device 40 includes control unit 410, communication unit 420, and driving unit 430. Control unit 410 is a computer including a processor such as a CPU, and storage device such as a ROM or a RAM. The CPU executes a program stored in a ROM, while using a RAM as a work area, to control components of moving device 40. Communication unit 420 receives a signal complying with the Bluetooth standard, such as a movement signal to communicate with instruction device 30. Driving unit 430 includes four wheels, a motor, and a stepping motor. Driving unit 430 causes the motor to rotate wheels, and causes the stepping motor to change a direction of the wheels. The motor may rotate bi-directionally so that moving device 40 may move forward or backward. The stepping motor may change a direction of the wheel by 90 degrees to the right or left relative to the front so that moving device 40 may move in a straight direction or in a lateral direction.

[Operation]

Now, an operation of each device in remote instruction system 1 will be described. In remote instruction system 1, when air-conditioner 4 and TV 5 are purchased and installed in the room for the first time, instruction device 30 does not store data on command names and instruction signals for the appliances to be controlled. Therefore, in remote instruction system 1, a command storage processing is carried out whereby data on command names and instruction signals is stored in instruction device 30. Data indicative of a command name and an instruction signal will be referred to as "command data." First and second command storage processing are described with reference to FIGS. 6 to 9 below.

Figure 6:
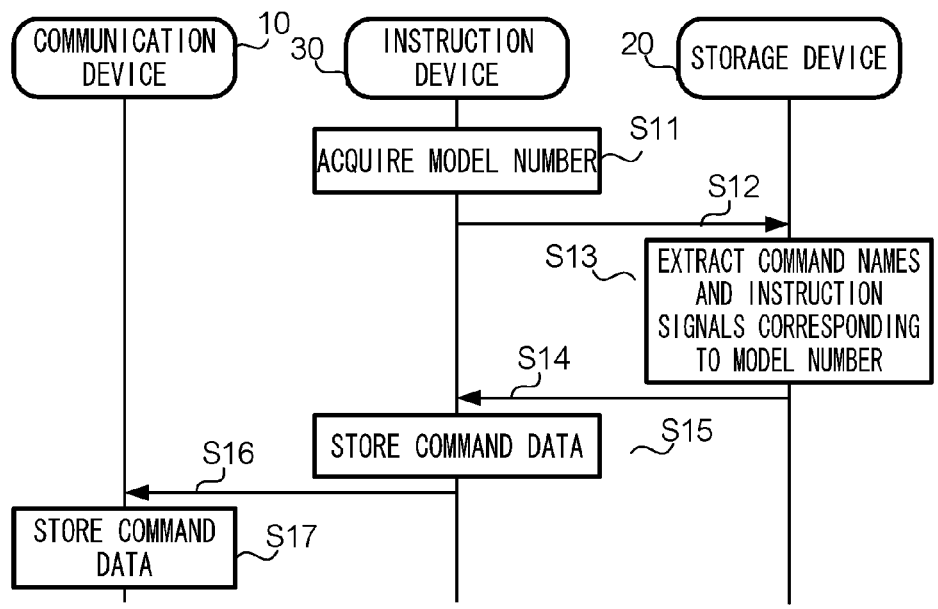
FIG. 6 is a sequence chart showing a procedure of a first command storage processing.

FIG. 6 is a sequence chart showing a procedure of the first command storage processing. The first command storage processing is carried out when a model number of an appliance to be controlled is recorded in storage device 20. It is to be noted that in the following sequence charts, a device is described as a subject of a processing; however, an entity that actually carries out a processing is a control unit of a device. The first command storage processing is started when a user performs an operation to input a model number of an appliance to be controlled. When touch sensor 332 receives the input operation, (control unit 310 of) instruction device 30 initially acquires the model number inputted by the user (step S11). Subsequently, instruction device 30 sends data on the acquired model number to storage device 20 (step S12). Subsequently, storage device 20 extracts from the command DB stored in storage unit 220, a command name and an instruction signal, which are associated with the model number sent by instruction device 30 (step S13).

FIG. 7 is a chart showing data stored in the command DB. In the chart, items titled "MODEL NUMBER," "MANUFACTURER," "APPLIANCE TYPE," "SIGNAL TYPE," "COMMAND NAME," and "INSTRUCTION SIGNAL," are shown. In the column "MODEL NUMBER," two model numbers "X-001" and "Y-001" are shown, which represent a model number of TV 5 and a model number of air-conditioner 4, respectively. In the chart, it is shown that a manufacturer of TV 5 is "X," an appliance type is "TV RECEIVER," and a signal type is "INFRARED." The appliance type is a name such as air-conditioner, TV receiver, or light, which is assigned to a group of appliances to be controlled sharing its purpose and function. Appliances to be controlled sharing an appliance type are likely to share commands since their purpose and function are similar. In the chart, also shown are operations of "POWER ON/OFF," "VOLUME UP," and "VOLUME DOWN" as a command name of TV 5, and symbols of "AAA. . ," "BBB. . ," and "CCC. . ," which represent an instruction signal for causing TV 5 to perform such an operation. In the chart, it is also shown that a manufacturer of air-conditioner 4 is "Y," an appliance type is "AIR-CONDITIONER," and a signal type is "BLUETOOTH." Also shown are operations of "POWER ON/OFF," "TEMPERATURE SETTING UP," and "TEMPERATURE SETTING DOWN" as a command name of air-conditioner 4, and symbols of "DDD. . ," "EEE. . ," and "FFF. . ," which represent an instruction signal for causing air-conditioner 4 to perform such an operation.

For example, in a case where the model number acquired by instruction device 30 at step S11 is "X-001," storage device 20 extracts at step S13 command names of "POWER ON/OFF," "VOLUME UP," and "VOLUME DOWN," and instruction signals of "AAA. . ," "BBB. . ," and "CCC. . " Storage device 20 sends command data indicative of the extracted command names and instruction signals to instruction device 30 (step S14). Instruction device 30 stores the command data sent from storage device 20 in storage unit 320 (step S15). Subsequently, instruction device 30 sends the stored command data to communication device 10 (step S16). Communication device 10 stores the command data sent from instruction device 30 in storage unit 120 (step S17). As a result, in the first command storage processing, the command data stored in instruction device 30 is stored in communication device 10.

FIG. 8 is a sequence chart showing a procedure of the second command storage processing. The second command storage processing is carried out when a model number of an appliance to be controlled is not stored in the command DB. A case where a model number of TV 5 is not stored in the command DB will be described as an example below. In the second command storage processing, storage unit 320 of instruction device 30 stores data on an appliance type and corresponding image data showing command images predetermined for the appliance type. The command images are images associated with the above-mentioned command names. Since appliances sharing an appliance type are likely to share commands, as described above, an appliance to be controlled, even if its model number is not stored in the command DB, may be instructed to perform operations indicated by command names associated with image data showing the command images.

The second command storage processing is started when a user operates touch screen unit 330 of instruction device 30 to input a model number and an appliance type. When touch screen unit 330 receives the input operation, instruction device 30 acquires the input model number and an appliance type (step S21). It is herein assumed that an appliance type "TV receiver" is acquired. Subsequently, instruction device 30 displays command images represented by image data stored in storage unit 320 in association with the acquired appliance type, on the display surface of display unit 331 (step S22).

Figure 9:
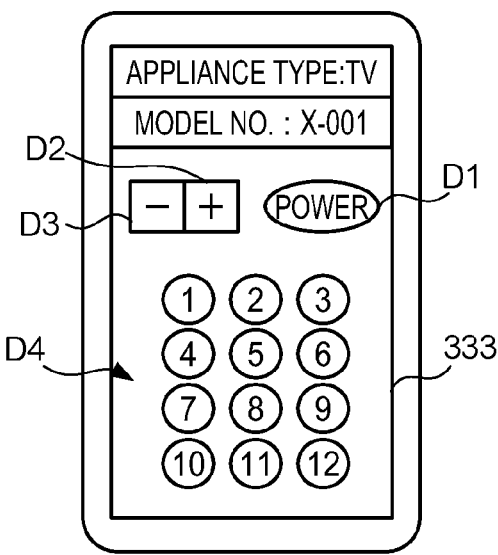
FIG. 9 is a diagram showing an example of an image displayed on a display surface of an instruction device.

FIG. 9 is a diagram showing an example of an image shown on display surface 333 of display unit 331 at step S22. On display surface 333, character strings "APPLIANCE TYPE: TV" and "MODEL NUMBER: X-001," and command images D1, D2, D3, and D4 are displayed. Instruction device 30 displays the character strings based on the model number and appliance type acquired at step S21. Command images D1, D2, D3, and D4 show commands of power on/off, volume up, volume down, and selection of one of channels 1 to 12, respectively.

The user selects a command image by indicating one of the displayed command images. Instruction device 30 identifies the selected command image based on data provided by touch sensor 332 (step S23). Subsequently, the user presses a button of remote control 5R for TV 5 indicative of a command represented by the selected command image, with remote control 5R positioned so that an instruction signal can reach instruction device 30 (step S24). For example, in a case where the user selects command image D1, s/he presses a button of remote control 5R corresponding to power on/off. Remote control 5R sends a TV instruction signal corresponding to the pressed button (step S25). When instruction device 30 receives the TV instruction signal sent from remote control 5R, instruction device 30 stores data on the received TV instruction signal in storage unit 320 in association with data on the model number and appliance type acquired at step S21 and image data representing the command image identified at step S23 (step S26). By performing the series of processing of steps S23 to S26 repeatedly, commands of power on/off, volume up, volume down, and selection of one of channels 1 to 12 are associated with command images D1, D2, D3, and D4, respectively. Instruction device 30 stores command data in this way. After performing the processing of step S26, instruction device 30 performs the processing of step S16 shown in FIG. 6 to send command data to communication device 10. After that, the processing of step S17 is performed so that communication device 10 stores the command data stored in instruction device 30 in the second command storage processing.

Now, a motion storage processing will be described. The motion storage processing is a processing by which data indicative of a motion of moving device 40 moving from a position (for example, position B0) to another position (for example, position B5) is stored. Hereinafter, the data will be referred to as "motion data." The motion data is a collection of movement signals, which are sent from instruction device 30 to moving device 40 while the movement is in progress, and time data indicative of times at which the movement signals are sent. The motion storage processing will be described with reference to FIGS. 12 to 15.

Figure 10:
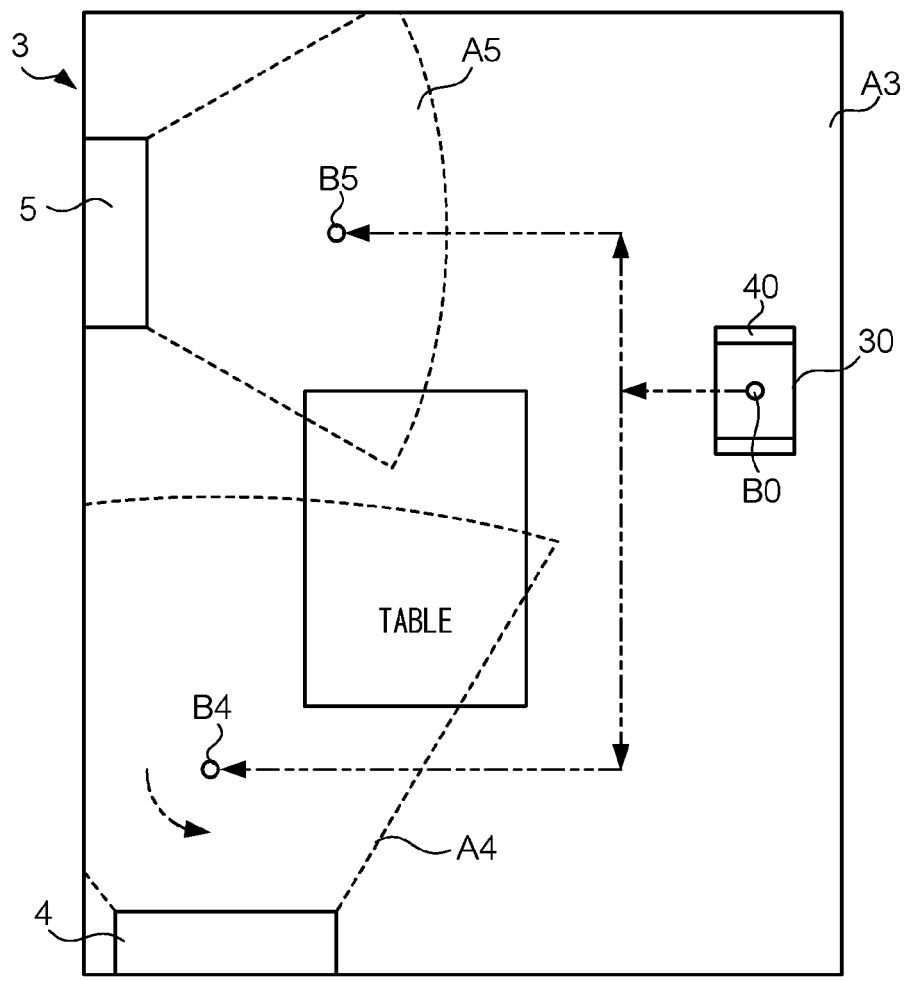
FIG. 10 is a diagram showing a room as viewed vertically from above.

FIG. 10 is a diagram showing room 3 as viewed vertically from above. In room 3, air-conditioner 4, TV 5, instruction device 30, moving device 40, and a table are provided. Room 3 is rectangular. The length of room 3 in the vertical direction in FIG. 10 is longer than the length of room 3 in the lateral direction in FIG. 10. In room 3, TV 5 is installed at the upper left, the table is installed at the center, and air-conditioner 4 is installed at the lower left. Moving device 40 is set between the right-center and the upper right of room 3 so that the center of instruction device 30 is positioned at position B0. Position B0 is a position pre-determined as a position where instruction device 30 is positioned when no remote instruction is provided by a user. Moving device 40 is set at position B0 so that imaging unit 340 of instruction device 30 faces the left wall. The state of moving device 40 set in this way will be hereinafter referred to as "initial state." In the present embodiment, motion data B0B4 is stored for causing moving device 40 to move from the initial state to position B4 facing air-conditioner 4, and motion data B0B5 is stored for causing moving device 40 to move from the initial state to position B5 facing TV 5. Position B4 is included in the above-mentioned space A4 where instruction device 30 is able to perform infrared communication with air-conditioner 4. Position B5 is included in the above-mentioned space A5 where instruction device 30 is able to perform infrared communication with TV 5.

Figure 11:
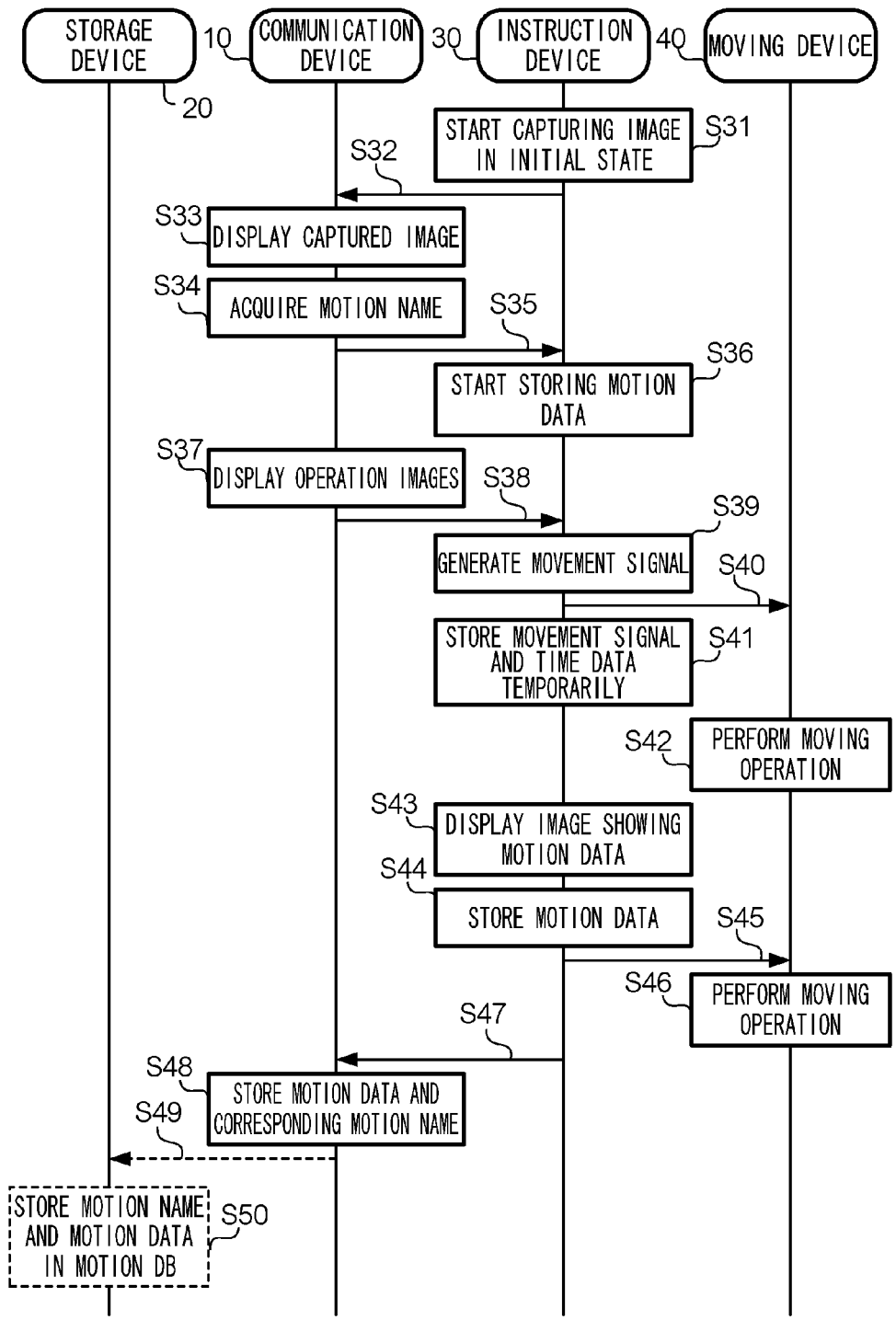
FIG. 11 is a sequence chart showing a procedure of a motion storage processing.

FIG. 11 is a sequence chart showing a procedure of the motion storage processing. A case where the motion data B0B5 is stored will be described an example below. The motion storage processing is started after moving device 40 and instruction device 30 are set at the initial state. In the motion storage processing, when a user performs an input operation to cause instruction device 30 to start capturing an image, and touch screen unit 330 receives the input operation, instruction device 30 starts capturing an image using imaging unit 340 (step S31). Subsequently, instruction device 30 sends image data representing the captured image to communication device 10 (step S32). Communication device 10 displays the captured image represented by the image data sent from instruction device 30 at step S32, on the display surface of display unit 151 (step S33). The captured image will be described with reference to FIG. 12.

Figure 12:
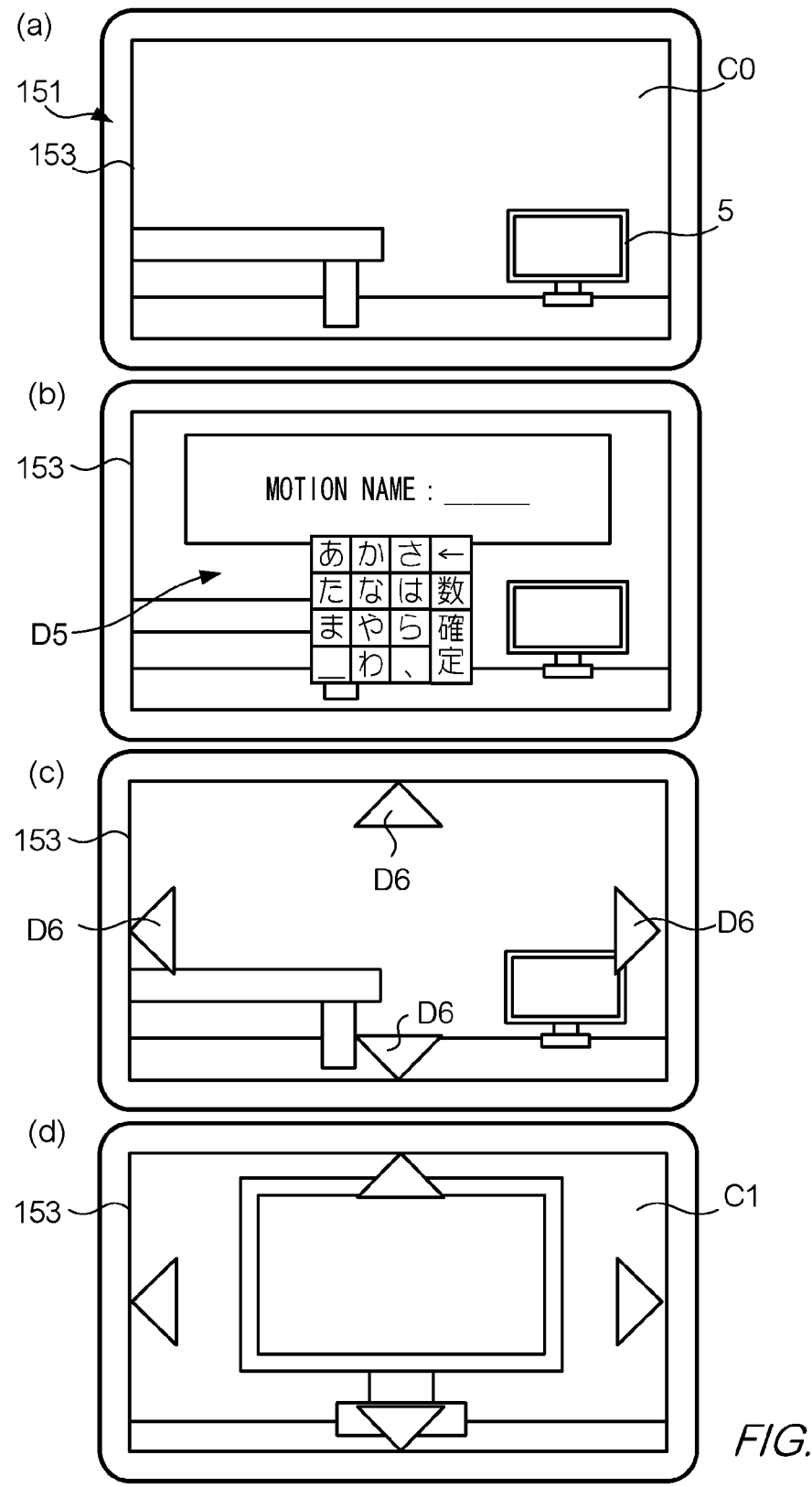
FIG. 12 is a diagram showing examples of captured images displayed in a motion storage processing.

FIG. 12 is a diagram showing examples of captured images displayed on display surface 153 of display unit 151 in the motion storage processing. FIG. 12(a) shows captured image C0 displayed on display surface 153 at step S33. Captured image C0 shows the table and TV 5 shown in FIG. 10. When the user performs an input operation to indicate captured image C0, instruction device 30 displays image D5 shown in FIG. 12(b) for letting the user input a motion name. While image D5 is on display, the user performs an input operation to image D5 to input a motion name. The user may input a character string such as "MOVE TO TV FRONT" or "MOVE TO A/C FRONT," which indicates that the motion is movement of moving device 40, and also indicates the destination of the movement. When communication device 10 receives the input operation, the device acquires the input motion name (step S34). Subsequently, communication device 10 sends, to instruction device 30, data indicating the motion name, and request data that requests instruction device 30 to start recording motion data (step S35). When instruction device 30 receives the request data sent at step S35, instruction device 30 stores the data sent from communication device 10, and starts recording motion data (step S36).

Subsequently, communication device 10 displays operation images for allowing the user to perform an input operation to move moving device 40 (step S37). FIG. 12(c) shows operation images D6 displayed on display surface 153. Operation images D6 are four images each showing an isosceles triangle, which points to an upward, downward, left, or right direction on display surface 153. The upward, downward, left, or right direction is a direction indicated by operation image D6. If one of operation images D6 is selected or indicated by the user, moving device 40 moves in a direction indicated by the selected operation image. The upward, downward, left, and right directions correspond to forward movement, backward movement, leftward movement, and rightward movement, respectively. The "forward" direction herein is a direction toward the center of an image captured by imaging unit 340, and the "backward" direction herein is a direction opposite to the forward direction. It is to be noted that an input operation to move moving device 40 may be performed by tilting communication device 10. Communication device 10 may include a means for detecting a tilt in plural directions, such as an angular velocity sensor (or a gyro sensor) or an acceleration sensor, and cause moving device 40 to move in a direction of tilt detected by the means.

When the user performs an input operation to one of operation images D6, communication device 10 requests instruction device 30 to send a movement signal for causing moving device 40 to move in a direction corresponding to the selected image (step S38). When instruction device 30 receives the request data sent from communication device 10, instruction device 30 generates a movement signal (step S39) and sends the movement signal (step S40) as requested. Instruction device 30 also temporarily stores data on the movement signal and time data in a RAM (step S41). The movement signal generated at step S39 is, specifically, a signal indicative of a direction of the wheels of driving unit 430 of moving device 40, and of a direction of rotation of the wheels. When moving device 40 receives the movement signal sent from instruction device 30, moving device 40 performs a moving operation according to the received movement signal (step S42). Moving device 40 sets a direction of the wheels to a direction indicated by the movement signal, and rotates the wheels in a direction indicated by the movement signal. Moving device 40 moves back and forth, right and left as described. The series of processing of steps S38 to S42 are continuously carried out at a predetermined interval (for example, at an interval of 0.1 seconds) while the user indicates operation image D6. As described in the foregoing, control unit 310 of instruction device 30 serves as a movement control means that controls movement of moving device 40 according to a request by communication device 10. The request herein is a request to control unit 310.

The user performs an input operation to move moving device 40 until it reaches position B5, while seeing a captured image of room 3 displayed on display surface 153. FIG. 12(d) shows captured image C1, which is displayed on display surface 153 when moving device 40 has reached position B5. Captured image C1 does not show the table, and shows TV 5, which is larger than that shown in captured image C0. While moving device 40 moves from position B0 to position B5, the series of processing of steps S38 to S42 are carried out repeatedly. Plural movement signals and items of time data temporarily stored in the RAM of instruction device 30 as a result of the repeated operations will be hereinafter referred to as "motion data B0B5." Motion data B0B5, for example, represents a motion of moving device 40 that moves from position B0 to position B5 along three arrows of a two-dot chain line shown in FIG. 10. More specifically, in a case where the movements along the arrows take one second, one second, and two seconds, respectively, motion data B0B5 represents a motion of moving device 40 that first moves forward for one second, secondly moves rightward for one second, and lastly moves forward for two seconds.

Subsequently, if the user performs an input operation to indicate any part of display surface 153, instruction device 30 displays an image showing the motion data (step S43).

Figure 13:
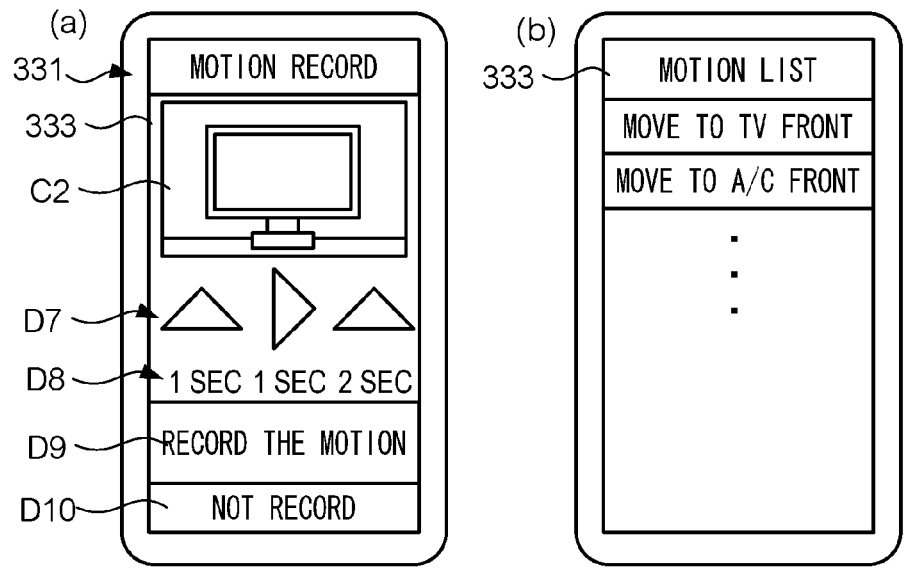
FIG. 13 is a diagram showing examples of images displayed on a display surface of an instruction device.

FIG. 13 is a diagram showing examples of images displayed on display surface 333 of display unit 331. FIG. 13(*a*) shows an example of the image displayed at step S43. According to the example image, a character string "MOTION RECORD" and captured image C2, which is being captured by imaging unit 340, are displayed on display surface 333 in the descending order. Below captured image C2, image D7 is displayed where operations images D6 selected by the user (in the example image, operation images D6 showing upward, right, and upward directions) are arranged from the left side in the descending order of selection. Below image D7, image D8 is displayed showing times for which each operation image D6 has been selected (specifically, character strings of "1 SEC," "1 SEC," and "2 SEC"). Images D7 and D8 show the motion data. In other words, images D7 and D8 show a path along which moving device 40 moves according to the motion data. In the present example, a path is shown along which moving device 40 moves forward for one second, moves leftward for one second, and lastly moves forward for two seconds. The path is a path indicated by the motion data. Moving device 40 moves to a destination indicated by a motion name along the path.

Below images D7 and D8, image D9 showing a character string "RECORD THE MOTION" and image D10 showing a character string "NOT RECORD" are displayed. Images D9 and D10 can be selected by an input operation performed by the user. If image D10 is selected by the user, instruction device 30 deletes motion data B0B5 stored in the RAM. In this case, the following processing is not carried out. On the other hand, if image D9 is selected by the user, instruction device 30 stores, in storage unit 320, motion data B0B5 stored in the RAM, in association with data indicative of a motion name (step S44). FIG. 13(*b*) shows an example of a list of thus stored motion data, which is displayed on display surface 333. In the example list, character strings "MOTION LIST," "MOVE TO TV FRONT," and "MOVE TO A/C FRONT" are shown from above in the descending order. Each character string indicates a motion name, and also indicates a fact that motion data associated with the motion name is stored in storage unit 320. According to the foregoing series of processing, the user is able to determine whether the motion data should be stored, after confirming the results of the movement of moving device 40 such as captured image C2 and images D7 and D8.

Subsequently, instruction device 30 retrieves movement signals included in motion data B0B5 in a reverse chronological order, and sequentially sends a movement signal, by which moving device 40 is caused to move in a direction opposite to a moving direction indicated by a retrieved movement signal (step S45). When moving device 40 receives such a movement signal, it performs a moving operation opposite to that carried out at step S42 (step S46). As a result, moving device 40 moves from position B5 to position B0 so that it returns to the initial state. After performing the processing of step S45, instruction device 30 sends motion data B0B5 to communication device 10 (step S47). Communication device 10 stores motion data B0B5 in association with data on the above-mentioned motion name (step S48). As a result, communication device 10 stores data on position B0, data on the motion name, and motion data B0B5 in association with each other.

According to the motion storage processing described in the foregoing, motion data indicating a motion of moving device 40 that moves from position B0 to position B5 is stored in instruction device 30 and communication device 10.

By the above-mentioned first and second command storage processing, and motion storage processing, command data and motion data are stored in instruction device 30. Communication device 10 stores the command data or the motion data in association with a shortcut area. The shortcut area is an area included in a captured image displayed on display unit 151 of communication device 10, which area is selected by a user by indicating the area on touch screen unit 150. When a shortcut area is selected, communication device 10 requests instruction device 30 to perform a command or motion indicated by data associated with the shortcut area. The processing for associating command data or motion data with a shortcut area will be hereinafter referred to as "shortcut association processing."

Figure 14:
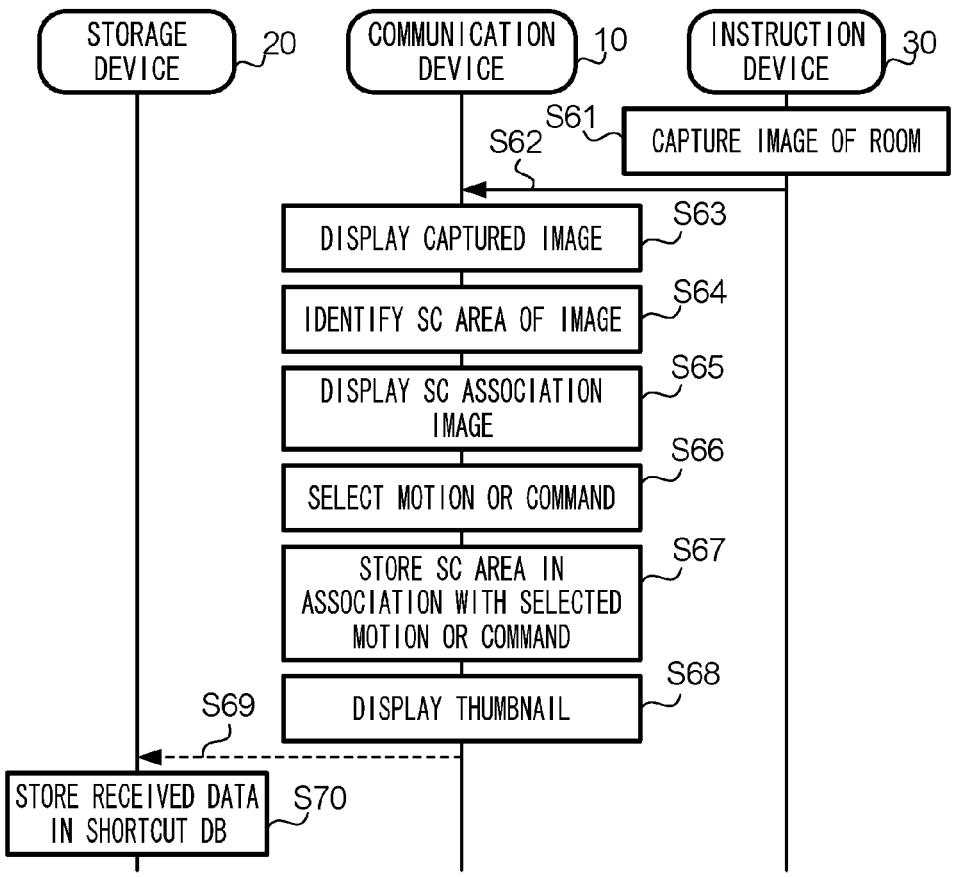
FIG. 14 is a sequence chart showing a procedure of a shortcut association processing.

FIG. 14 is a sequence chart showing a procedure of the shortcut association processing. A case where moving device 40 and instruction device 30 are at the initial state is described as an example below. Instruction device 30 initially captures an image of the room at the present location (namely, at position B0) (step S61), and sends image data representing the captured image to communication device 10 (step S62). Communication device 10 displays the captured image represented by the image data sent by instruction device 30 on display unit 151 (step S63). The image displayed at the step is the same as captured image C0 shown in FIG. 12.

Figure 15:
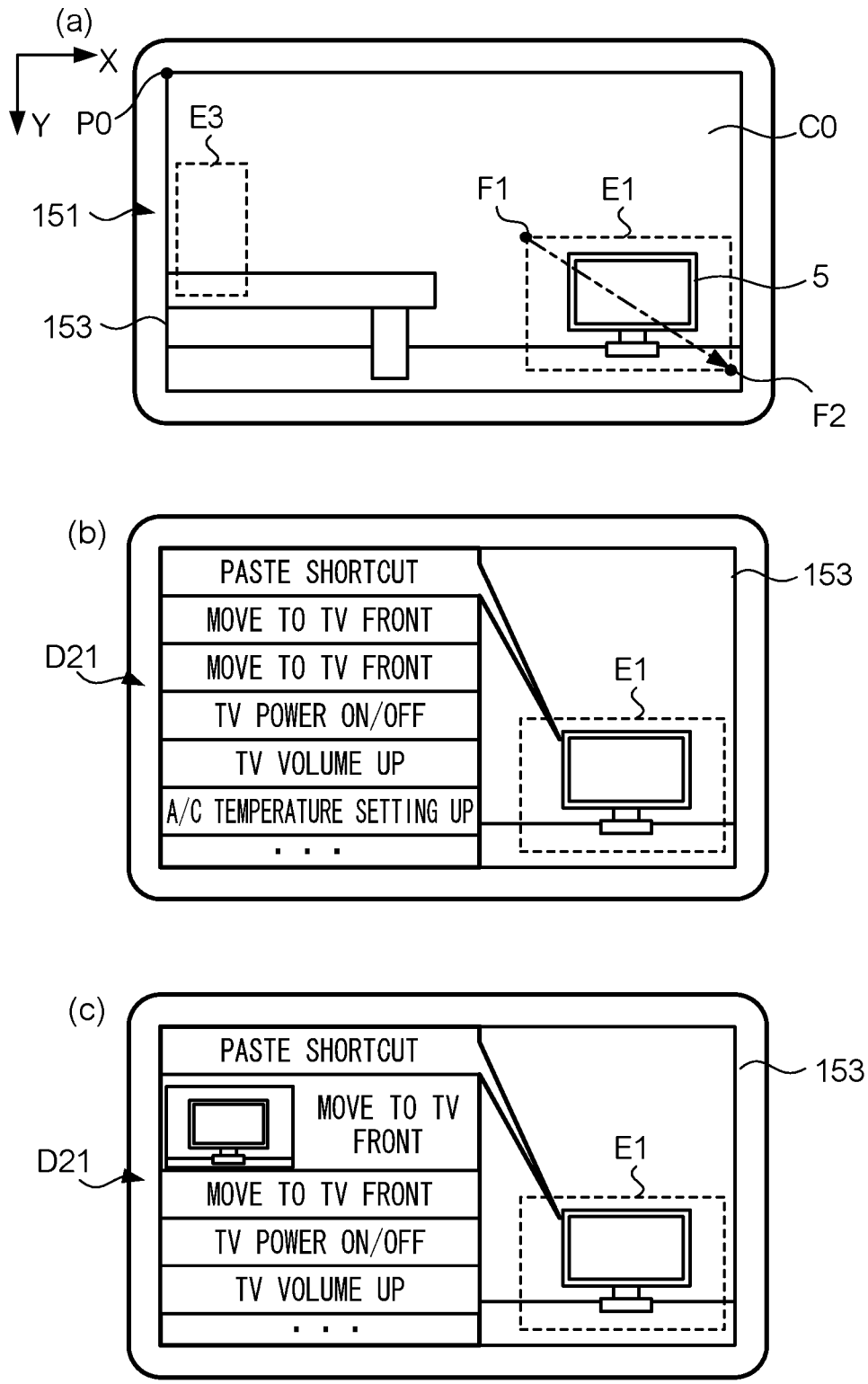
FIG. 15 is a diagram showing examples of captured images displayed in a shortcut association processing.

FIG. 15 is a diagram showing examples of captured images displayed on display surface 153 of display unit 151 in the shortcut association processing. FIG. 15(*a*) shows captured image C0 displayed on display surface 153 at step S63. A user, while the image shown in FIG. 15(*a*) is displayed, operates touch screen unit 150 to select area E1 including an image of TV 5 shown in captured image C0. Specifically, the user performs an input operation to trace the image of TV 5 displayed on display surface 153 from the upper left to the lower right as shown by the two-dot chain arrow in FIG. 15(*a*). Communication device 10 identifies a rectangular area as area E1, which includes, as vertexes on a diagonal line, indicated position F1 initially detected by touch sensor 152 and indicated position F2 last detected by touch sensor 152, and which includes sides along the horizontal direction on display surface 153 and sides along the vertical direction on display surface 153 (step S64). Communication device 10 stores, as data indicative of area E1, image data of captured image C0 and data on the coordinates of indicated positions F1 and F2 in storage unit 120 in association with each other. The coordinates consist of, in a coordinate system with origin P0 at the upper left corner of display surface 153, a coordinate in the X-axis direction (the right direction) and a coordinate in the Y-axis direction (the downward direction). Area E1 shown by a line made up of dashes in FIG. 12(*a*) is selected by a user as described above.

Subsequently, communication device 10 displays an image for the user to select motion data or command data to be associated with a shortcut area (step S65). The image will be hereinafter referred to as SC (shortcut) association image. FIG. 15(*b*) shows SC association image D21, which is displayed on display surface 153 at step S65. SC association image D21 is displayed at a side opposite to area E1 on display surface 153. In SC association image D21, a character string "PASTE SHORTCUT," and character stings indicating a command or motion "MOVE TO TV FRONT," "MOVE TO A/C FRONT," "TV POWER ON/OFF," "TV VOLUME UP," and "A/C TEMPERATURE SETTING UP" are shown from the above in the descending order. The commands and motions shown there are a portion of all commands and motions. By tracing the image in the vertical direction, the user is able to scroll the image so that the remaining commands or motions are displayed. The user selects a character string indicative of a command or motion to be associated with area E1 as a shortcut area (step S66).

Subsequently, communication device 10 stores motion data representing a motion indicated by the selected character string or command data representing a command indicated by the selected character sting, and data on area E1 in storage unit 120 in association with each other (step S67). As a result, storage unit 120 of communication device 10 stores image data on captured image C0, which is obtained by capturing an image of space A3 of room 3, data on area E1, which is an image area included in captured image C0, and request data representing a first or second request in association with each other. The first request herein is a request that asks instruction device 30 to cause moving device 40 to move to a destination in the space along a path indicated by motion data. The second request herein is a request that asks instruction device 30 to send an instruction signal indicated by command data.

Storage unit 120, in a case where an instruction signal can reach all appliances to be controlled from where instruction device 30 is positioned, may store only command data in association with a shortcut area. Alternatively, storage unit 120, in a case where a user only wishes to see a condition inside the room, may store only motion data in association with a shortcut area. Either way, storage unit 120 stores at least one of request data representing a first request and request data representing a second request in association with image data on a captured image and data on an area, as described above. Subsequently, communication device 10 displays the selected character string and a reduced image of area E1 (or a thumbnail) side-by-side (step S68). FIG. 12(c) shows an example of SC association image D21 displayed at step S68. In the example image, a character string "MOVE TO TV FRONT" has been selected by a user so that the selected character string and a thumbnail of area E1 are shown side-by-side. Communication device 10 displays the thumbnail by extracting area E1 from image data of captured image C0.

As a result of the shortcut association processing described in the foregoing, the user is able, by selecting a shortcut area, to request instruction device 30 to perform an execution instruction of a command or motion indicated with data associated with the shortcut. In a case where by the instruction moving device 40 performs a moving operation, a processing carried out by each device is referred to as "motion operation processing." In a case where by the instruction, an appliance to be controlled performs an indicated command, a processing carried out by each device is referred to as "command operation processing."

Figure 16:
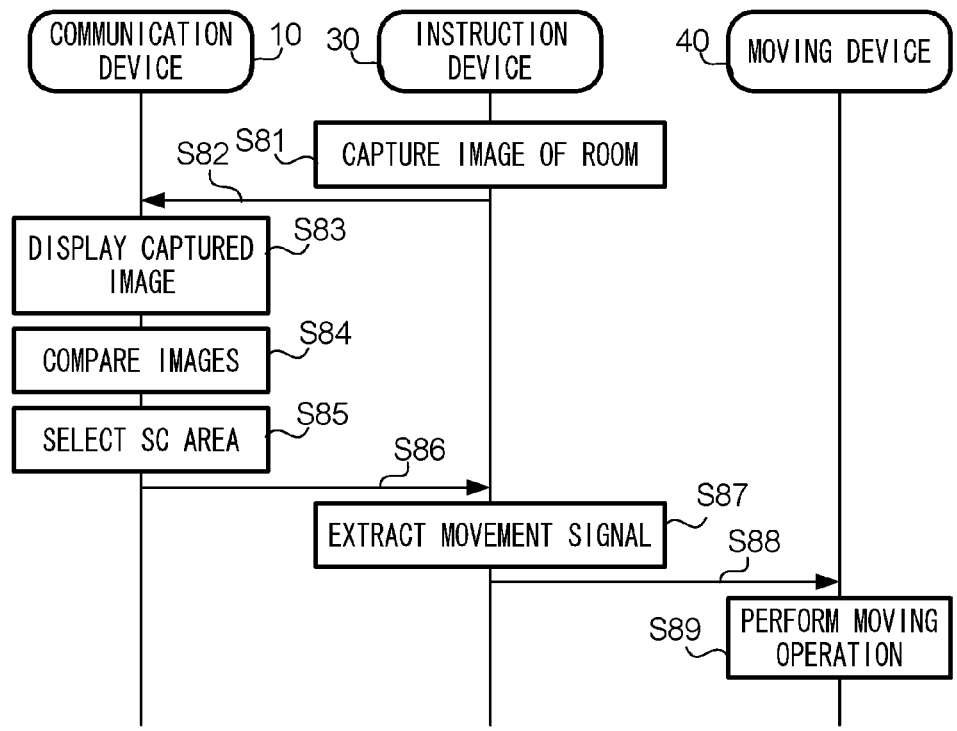
FIG. 16 is a sequence chart showing a procedure of a motion operation processing.

FIG. 16 is a sequence chart showing a procedure of the motion operation processing. A case where moving device 40 and instruction device 30 are at the initial state is described as an example below. Initially, instruction device 30 performs processing of steps S81 and S82, which are similar to steps S61 and S62 shown in FIG. 14, respectively. Subsequently, communication device 10 performs processing of step S83, which is similar to step S63.

Figure 17:
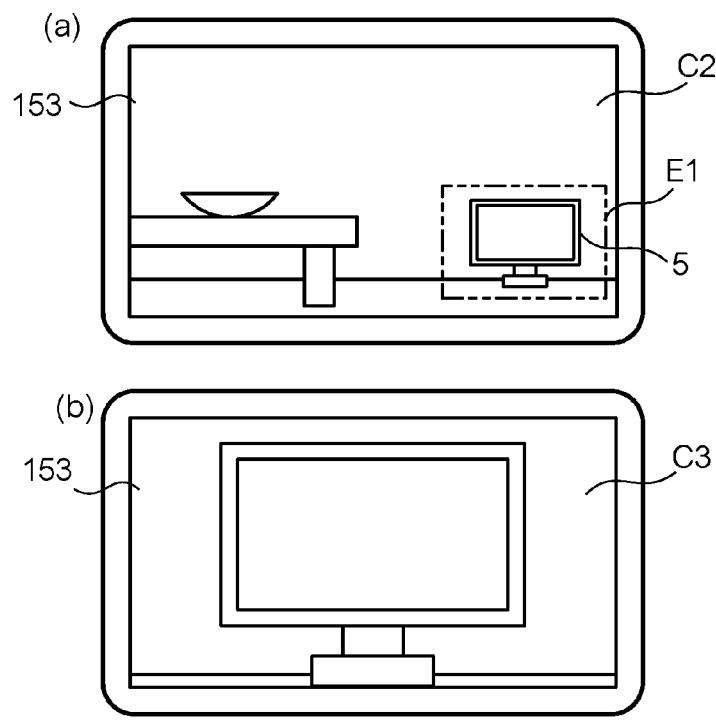
FIG. 17 is a diagram showing examples of captured images displayed in a motion operation processing.

FIG. 17 is a diagram showing examples of captured image displayed on display surface 153 in the motion operation processing. FIG. 17(a) shows captured image C2 displayed at step S83. In the drawing, area E1 is indicated by a two-dot chain line to highlight the area; however, the two-dot chain line is not shown. Since in the above shortcut association processing, area E1 including an image of TV 5 has been selected, a user selects or indicates area E1 including an image of TV 5. It is to be noted that communication device 10 may display an image showing area E1 (or a boundary of the image) so that the user may select area E1 if s/he forgets the position of area E1.

When the position indicated by the user is detected, communication device 10 determines whether the captured image displayed on display surface 153 matches a captured image represented by image data stored in storage unit 120, using a common pattern matching technique (step S84). For example, storage unit 120, after the shortcut association processing described above, stores data on area E1 (namely, image data representing captured image C0). Captured image C0 and captured image C2 are both an image captured when moving device 40 and instruction device 30 are at the initial state; however, since timings at which they are captured are different, all objects shown in the images are not necessarily identical. In captured image C2, a dish is shown on the table, which is not shown in captured image C0. Communication device 10, for example, calculates, for all corresponding coordinates of captured images C0 and C2, a square of the difference between brightness values, and if a total of the calculated values is equal to or smaller than a threshold value, determines that the two images match. Since the captured images may not completely match as described above, the threshold may be set so that when 70 percent or more of the two images match, a determination is made that the both images match. If it is determined that the both images do not match, communication device 10 terminates the motion operation processing.

If it is determined that the two images match, communication device 10 determines whether the detected position is included in area E1. If the detected position is not included in area E1, communication device 10 terminates the motion operation processing. On the other hand, if the detected position is included in area E1, communication device 10 determines that a shortcut area has been selected (step S85), and sends, to instruction device 30, command data or motion data (in the present example, motion data) stored in association with area E1, together with request data (step S86). The request data is data of a request for an operation indicated by command data or motion data. In the present example, the request data is data of a request for the first request described above. By performing the processing of steps S84, S85, and S86, control unit 110 of communication device 10 sends motion data and request in a case where image data is stored in storage unit 120 representing a captured image displayed on display surface 153 when an indicated position is detected by touch sensor 152, and the detected indicated position is included in a shortcut area associated with image data representing captured image C0. The case herein, where image data representing a captured image data is stored in storage unit 120, includes a case where although an arrangement of objects are somewhat different, a value obtained as a result of a pattern matching is within a prescribed range (in the above example, a value is equal to or smaller than a threshold), in addition to a case where data on a completely same captured image is stored.

Instruction device 30, in response to the request data sent from communication device 10, performs an operation indicated by the motion data sent together with the request data. Specifically, instruction device 30 extracts movement signals included in the motion data in the order of an early date indicated by corresponding time data included in the same (step S87), and sequentially sends them for a predetermined interval (for example, at an interval of 0.1 seconds) (step S88). Moving device 40 performs moving operations indicated by the movement signals sent from instruction device 30 (step S89). In the present example, it is assumed that motion data having a motion name "MOVE TO TV FRONT" is used. After the steps S87 to S89 are repeatedly carried out, moving device 40 moves to position B5 facing TV 5, as indicated by the motion name. As a result, captured image C3 shown in FIG. 17(*b*) is displayed on display unit 151.

Now, a case is described where command data is associated with a shortcut area after the motion operation processing is performed and a shortcut association processing shown in FIG. 14 is performed. In the present example, captured image C3 shown in FIG. 17(*b*) is displayed on display surface 153 at step S63, and a user selects a certain area in captured image C3.

Figure 18:
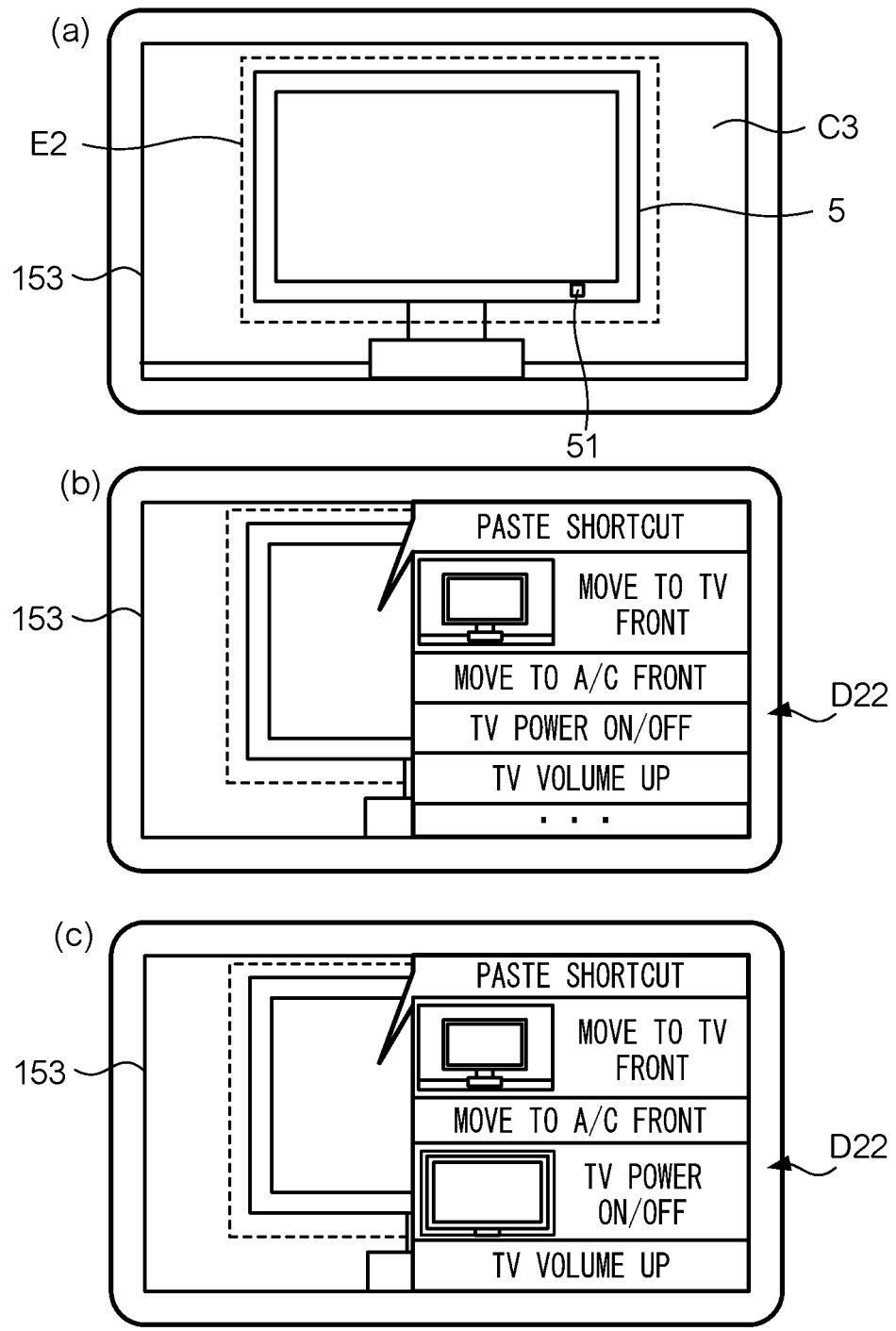
FIG. 18 is a diagram showing examples of captured images displayed in a shortcut association processing.

FIG. 18 is a diagram showing examples of captured images displayed on display surface 153 in the present shortcut association processing. FIG. 18(*a*) shows area E2 selected by the user. The user selects area E2, which includes an image of the screen of TV 5 shown in captured image C3. Communication device 10 displays shortcut association image D22 shown in FIG. 18(*b*) (step S65). The user may select, among character strings each indicative of a command name or motion name shown in the image, a character string "TV POWER ON/OFF" as a character string to be associated with area E2 as a shortcut area (step S66). Subsequently, communication device 10 stores data on a command indicated by the selected character string "TV POWER ON/OFF" and data on area E2 in association with each other (step S67). Subsequently, communication device 10 displays the character string and a thumbnail of area E2 side-by-side as shown in FIG. 18(*c*) (step S68).

After the shortcut association processing is performed, the above-mentioned command operation processing becomes available.

Figure 19:
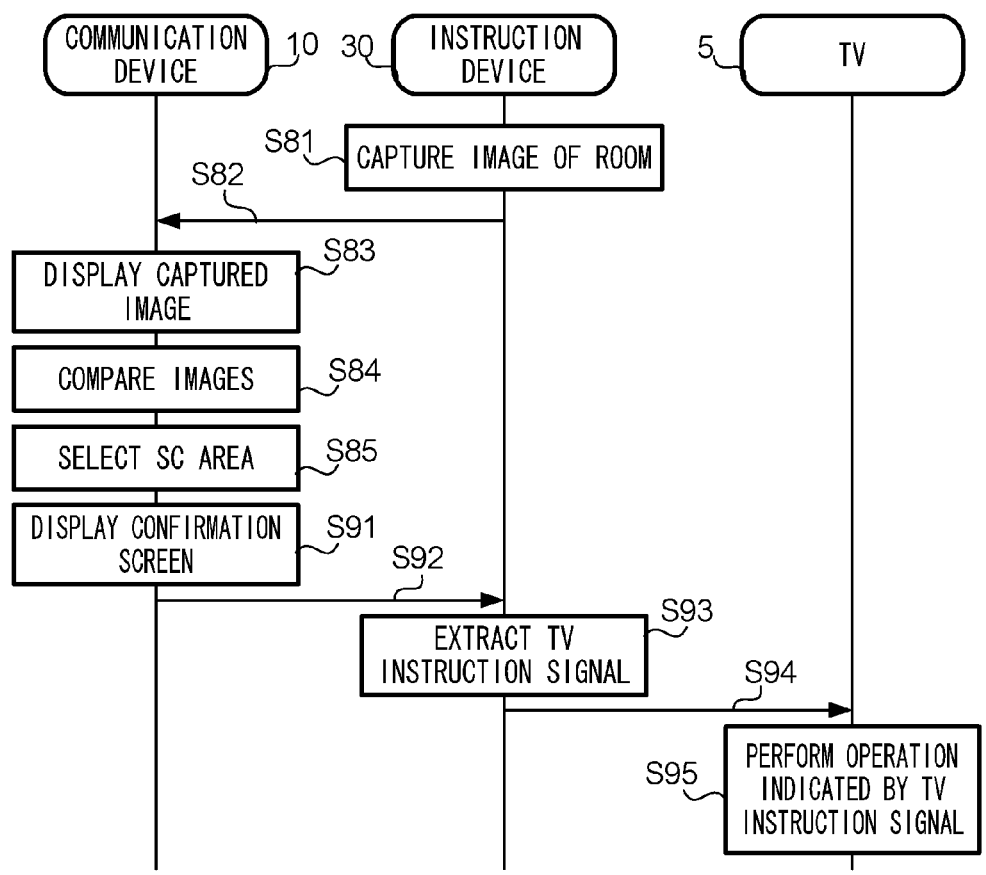
FIG. 19 is a sequence chart showing a procedure of a command operation processing.

FIG. 19 is a sequence chart showing a procedure of the command operation processing. A case where moving device 40 has moved to position B5 as a result of a motion operation processing is described as an example below. Initially, the processing of steps S81, S82, and S83 shown in FIG. 16 is performed so that an image captured at position B5 is displayed on display surface 153.

Figure 20:
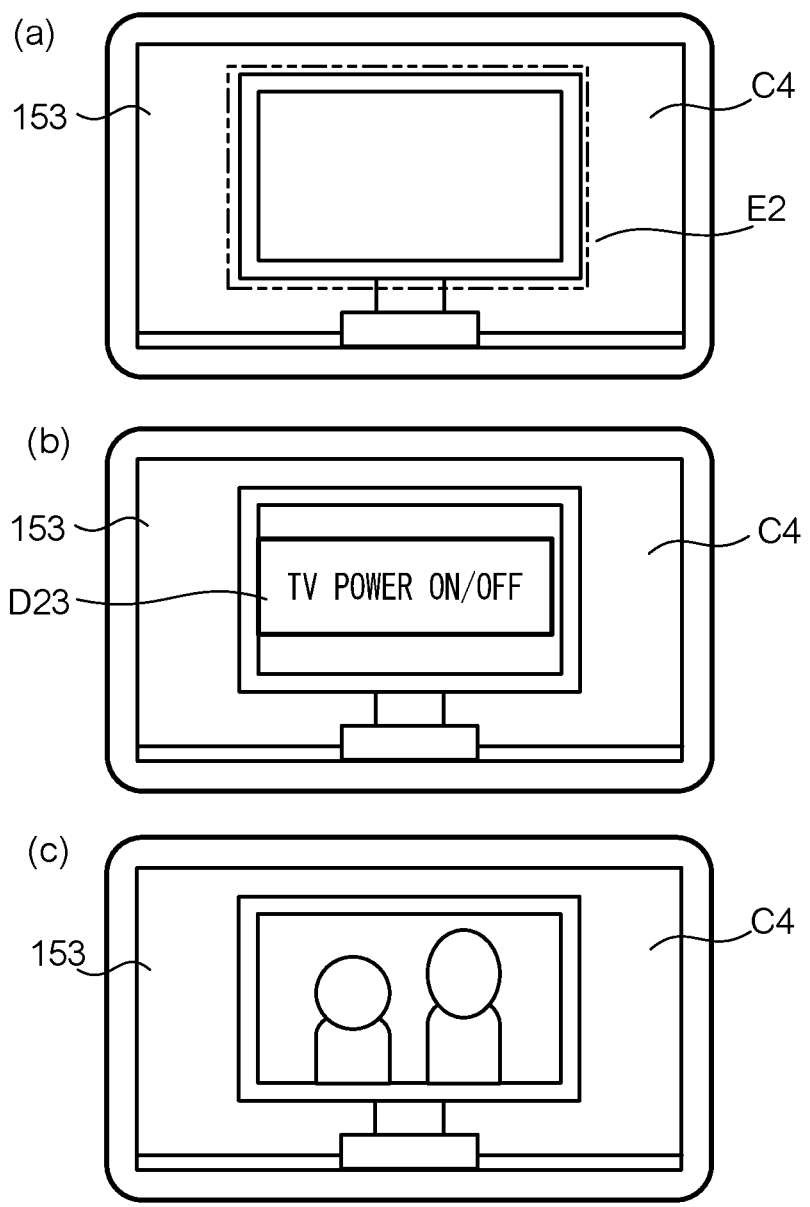
FIG. 20 is a diagram showing examples of captured images displayed in a command operation processing.

FIG. 20 is a diagram showing examples of captured images displayed on display surface 153 in the command operation processing. FIG. 20(*a*) shows captured image C4 displayed at step S83 in the present example. Captured image C4 shows TV 5 that is set at power off. A user confirms that TV 5 is at a power off state with reference to captured image C4, and may perform an input operation to set TV 5 to power on (in other words, an operation to select area E2). In the drawing, area E2 is indicated by a two-dot chain line to highlight the area; however, the two-dot chain line is not displayed. Since in the shortcut association processing, area E2 including an image of the screen of TV 5 has been selected, the user selects or indicates area E2 including an image of the screen.

Subsequently, communication device 10, when the position indicated by the user is detected, performs a processing of step S84. In the present example, it is determined that captured image C3, data of which is stored as data representing area E2 shown in FIG. 18, matches captured image C4. If the detected position is included in area E2, communication device 10 determines that a shortcut area has been selected (step S85). Subsequently, communication device 10 displays a command confirmation image on display surface 153 for the user to confirm a command associated with the selected shortcut area (step S91). FIG. 20(*b*) shows command confirmation image D23 displayed at step S91. Command confirmation image D23 shows a character string "TV POWER ON/OFF." Command confirmation image D23 can be selected through a user's input operation. The user confirms a command associated with the shortcut area with reference to the character string, and if no problem is detected, selects command confirmation image D23.

If command confirmation image D23 is selected by the user, communication device 10 sends, to instruction device 30, command data stored in association with area E2, together with request data (in the present example, request data representing the above-mentioned second request) (step S92). Instruction device 30, in response to the request data sent from communication device 10, performs an operation indicated by the command data sent together with the request data. Specifically, instruction device 30 extracts a TV instruction signal indicated by the command data sent from communication device 10 from plural instruction signals stored in storage unit 320 (step S93). Subsequently, instruction device 30 sends the extracted TV instruction signal (step S94). In the present example, since instruction device 30 is at position B5, the TV instruction signal is able to reach TV 5. TV 5 receives the TV instruction signal sent from instruction device 30, and performs an operation indicated by the signal (step S95). In the present example, TV 5 performs an operation of "TV POWER ON/OFF." As a result, TV 5 is set at power on so that captured image C4 shown in FIG. 20(*c*) is displayed on display surface 153, which image shows TV 5 displaying a TV program.

In a case where each of motion data and command data is associated with a shortcut area, either a motion operation processing or a command operation processing is carried out depending on a shortcut area selected by a user. Below, if it is not necessary to distinguish both processing, they will be collectively referred to as "shortcut operation processing." In the shortcut operation processing, control unit 110 of communication device 10 sends motion data or command data, together with request data, so that instruction device 30 causes moving device 40 to move to a destination along a path indicated by the motion data, or so that instruction device 30 sends an instruction signal indicated by the command data. In other words, control unit 110 serves as a request sending means for sending request data representing the first or second request to instruction device 30.

In the present embodiment, a user is able to confirm a condition of an appliance to be controlled (TV 5), by performing a motion operation processing to see an image captured by imaging unit 340 of instruction device 30 that has moved near TV 5. Also, the user is able, after confirming a condition of TV 5, to remotely provide an operational instruction to TV 5 by performing a command operation processing. For example, if a user who intends to set TV 5 to power on is able to confirm that TV 5 is at power on state by seeing a captured image displayed at step S83 shown in FIG. 19, s/he may omit selecting area E2.

Also, in a case where air-conditioner 4 is not shown in an image (see FIG. 12(*a*)) captured by instruction device 30 being at the initial state, a user is able, by performing a motion storage processing shown in FIG. 11 whereby s/he may move moving device 40 to position B4 facing air-conditioner 4 while seeing captured images displayed on display surface 153, to enable each device to store motion data representing an operation to move from position B0 to position B4. When the processing is carried out, moving device 40 performs an operation to turn 90 degrees to the left so that imaging unit 340 of instruction device 30 faces air-conditioner 4 at position B4, as shown in FIG. 8. The operation may be performed by moving device 40 in response to an operation such as a double-click of selecting operation image D6 shown in FIG. 12(c), which indicates a left direction, twice for a predetermined time. If the motion data is associated by the user with area E3 indicated by a line made up of dashes shown in FIG. 15(a) in a shortcut association processing shown in FIG. 14, s/he may, by selecting area E3 in a motion operation processing, cause moving device 40 to move from position B0 to position B4. It may be that an area not relevant to an appliance to be controlled may be selected as a shortcut area as described. However, preferably, an area should be selected that easily reminds a user of corresponding command data or motion data.

[Second Embodiment]

A remote instruction system according to the second embodiment of the present invention is different from that of the first embodiment in that the system includes plural communication devices, plural instruction devices, and plural moving devices. In the remote instruction system, motion data and command data stored in each communication device is stored in storage device 20, and they can be shared with other communication devices.

Figure 21:
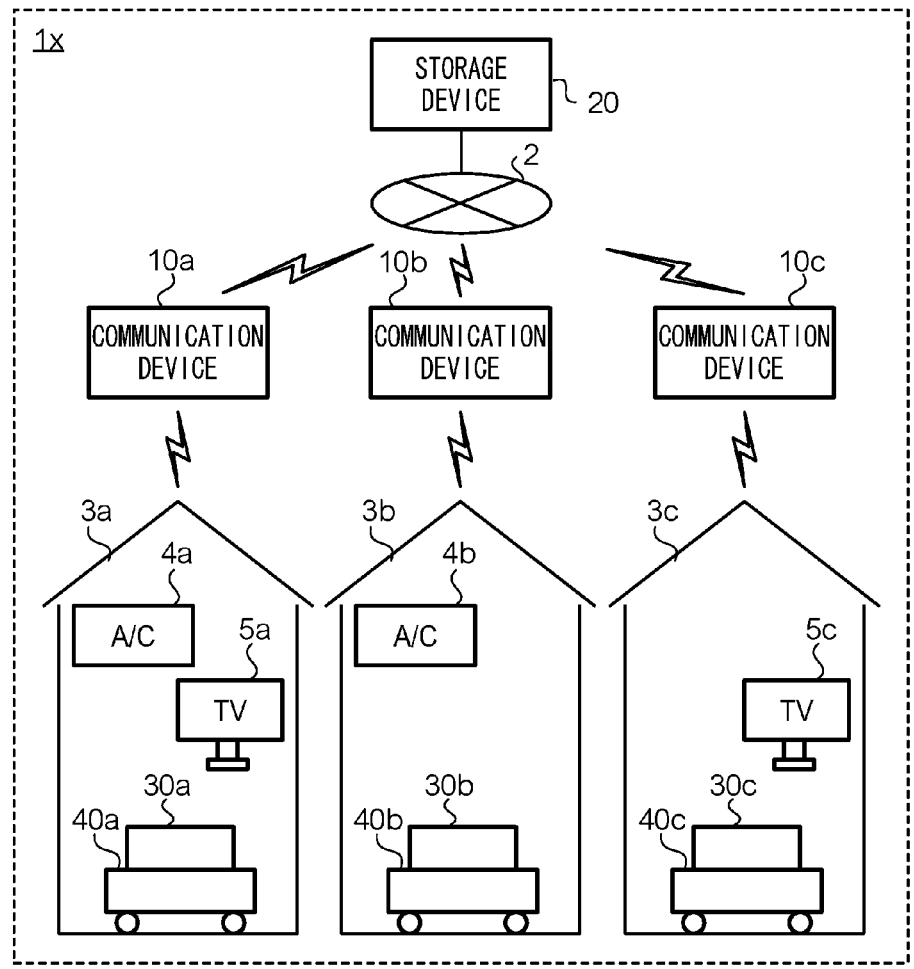
FIG. 21 is a block diagram showing a configuration of a remote instruction system according to a second embodiment.

FIG. 21 is a block diagram showing a configuration of remote control system 1x according to the second embodiment. Components shared with the first embodiment will be followed by a like symbol, and a description thereof will be omitted in the following description. Remote control system 1x includes communication devices 10a, 10b, and 10c, which are similar to communication device 10 in configuration, storage device 20, and communication line 2. Remote control system 1x also includes air-conditioner 4a, TV 5a, instruction device 30a, and moving device 40a, which are provided inside room 3a. Remote control system 1x also includes air-conditioner 4b, instruction device 30b, and moving device 40b, which are provided inside room 3b. Remote control system 1x also includes TV 5c, instruction device 30c, and moving device 40c, which are provided inside room 3c. Instruction devices 30a, 30b, and 30c are similar to instruction device 30 in configuration. Moving device 40a, 40b, and 40c are similar to moving device 40 in configuration. Among the devices, devices followed by a symbol with "a" at the end are owned by user A, devices followed by a symbol with "b" at the end are owned by user B, and devices followed by a symbol with "c" at the end are owned by user C.

In the present embodiment, after each of the above second command storage processing, motion storage processing, and shortcut association processing is carried out, command data, motion data, or data indicating a shortcut area, which is stored in a communication device and an instruction device, is stored in storage device 20. For example, in a case where a second command storage processing shown in FIG. 8 is carried out by devices owned by user A, instruction device 30a sends, to storage device 20, subsequent to processing of step S26, data on a model number and an appliance type, and command data indicative of a command shown by a command image and of a TV instruction signal, which are stored at step S26 (step S27). Storage device 20 stores, in the command DB, data on the model number, appliance type, command name, and instruction signal indicated by the data sent from instruction device 30a, in association with each other (step S28). According to the foregoing second command storage processing, in a case where model numbers of air-conditioners 4a and 4b are the same, or model numbers of TVs 5a and 5c are the same, instruction devices 30b and 30c are able to store command data for air-conditioner 4b and command data for TV 5c, respectively, by performing only a first command storage processing, without performing a second command storage processing.

Also, in the present embodiment, in a case where a motion storage processing shown in FIG. 11 is carried out by devices owned by user A, communication device 10a sends, to storage device 20, subsequent to processing of step S48, motion data and data on a motion data, which are stored at step S48 (step S49). Storage device 20 stores the items of data in a motion database (DB) in association with each other (step S50). The motion DB is a database stored in storage unit 220 of storage device 20, which stores different items of motion data. Storage device 20 sends the data stored in the motion DB to a communication device or an instruction device in response to a request from each device or for a predetermined interval. Accordingly, the motion data stored in the motion DB by communication device 10a and instruction device 30a can be stored in devices owned by user B or C to be utilized. Since shapes and sizes of rooms 3a, 3b, and 3c, and arrangements of items of furniture and an appliance to be controlled in the rooms may be different from each other, the motion data may not be used by devices owned by user B or C; however, motion data indicating a simple moving operation may be shared.

Also, in the present embodiment, in a case where a shortcut association processing shown in FIG. 14 is carried out by devices owned by user A, communication device 10a sends, to storage device 20, subsequent to processing of step S68, data indicating a shortcut area (for example, area E1 or E2) identified at step S64 and command data or motion data stored in association with the shortcut area (step S69). Storage device 20 stores the items of data sent from communication device 10a in a shortcut database (DB) in association with each other (step S70). The shortcut DB is a database stored in storage unit 220 of storage device 20, which stores data on a shortcut area, and motion data or command data in association with each other. Storage device 20 sends the data stored in the shortcut DB to a communication device or an instruction device in response to a request from each device or for a predetermined interval. Accordingly, the data stored in the motion DB by communication device 10a can be stored in communication devices 10b and 10c to be utilized.

In a case that communication devices 10b and 10c, if determining at step S84 shown in FIG. 16 that captured image on display matches a captured image represented by image data stored in a storage unit, displays, for example, a boundary of a shortcut area associated with the image data so that users B and C are able to know where the shortcut area is in the captured image on display. Communication devices 10b and 10c also display, near the shortcut area whose boundary is on display, a character string indicating a motion name of motion data associated with the shortcut area, or a character string indicating a command name of command data associated with the shortcut area, so that users B and C are able to know which motion data or command data is associated with the shortcut area.

[Third Embodiment]

A remote instruction system according to the third embodiment of the present invention is different from that of the first embodiment in that the system includes plural communication devices, and is different from that of the second embodiment in that the communication devices causes a single instruction device to provide a moving operation instruction to a moving device, or to provide an operation instruction to an appliance to be controlled. Further, in the present embodiment, motion data, command data, and data indicating a shortcut area are not stored in a communication device or an instruction device, but are stored in a storage device. In the present embodiment, processing of step S26 shown in FIG. 8, steps S44 and S48 shown in FIG. 11, and step S67 shown in FIG. 14 (namely, processing of storing the data in a communication device and an instruction device) is not carried out. On the other hand, processing of storing the data in storage device 20 such as steps S27, S28, S49, S50, S69, and S70 is carried out. Below, a case where a shortcut operation processing is carried out by devices shown in FIG. 21 will be described as an example.

Figure 22:
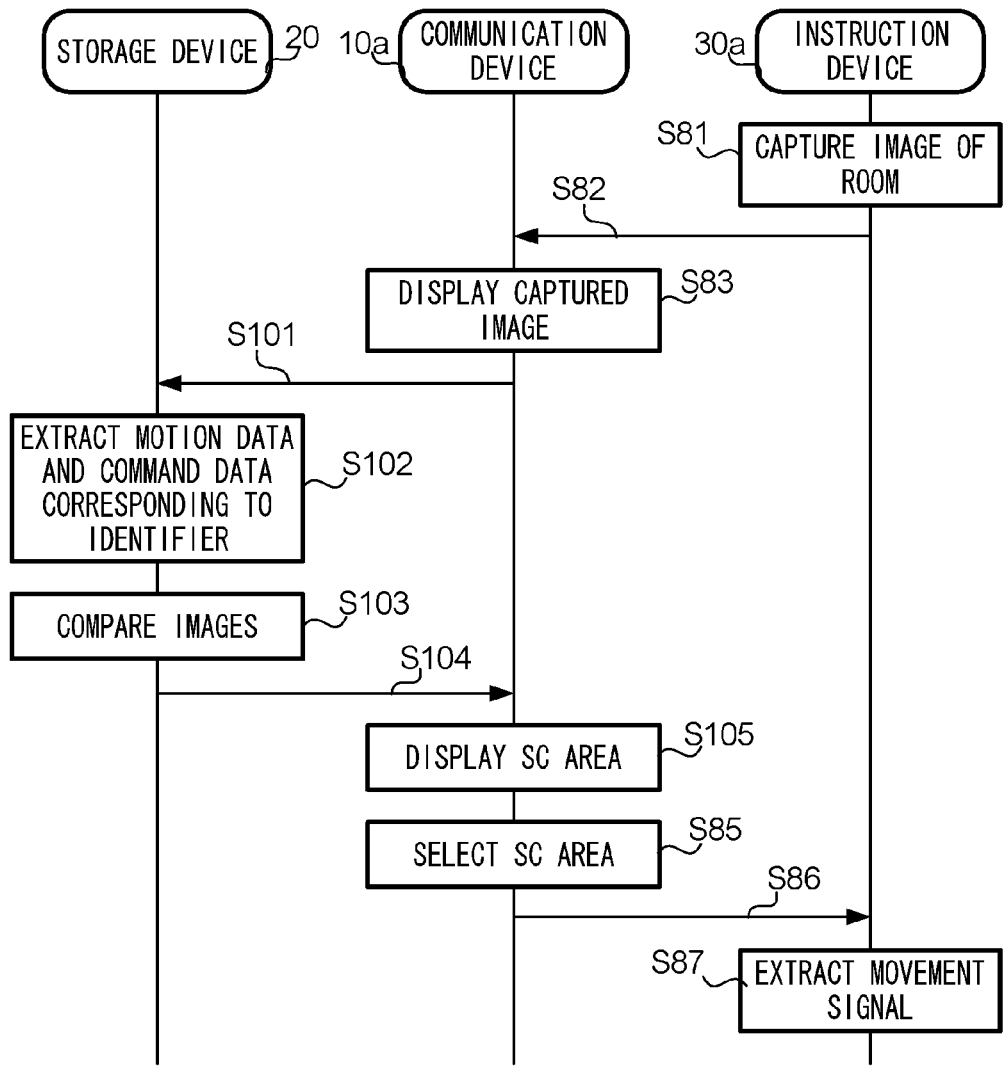
FIG. 22 is a sequence chart showing a procedure of a shortcut operation processing according to a third embodiment.

FIG. 22 is a sequence chart showing a procedure of a shortcut operation processing according to the third embodiment. The sequence chart shows a case where a shortcut operation processing is carried out by communication device 10a. In the shortcut operation processing, initially, processing of steps S81 to S83 shown in FIG. 16 is performed. Subsequently, communication device 10a sends image data representing a captured image and identifier data to storage device 20 (step S101). The identifier data is data identifying communication device 10a or user A carrying the device, which data is stored in storage unit 120. In the present embodiment, communication unit 130 of communication device 10a serves as an identifier notifying means that is caused by control unit 110 to notify storage device 20 of an identifier. Storage device 20 extracts motion data and command data corresponding to an identifier indicated by the identifier data from the shortcut DB (step S102).

FIGS. 23A and 23B are diagrams showing an example of data stored in the shortcut DB according to the present embodiment. In the chart, items titled "NO.," "IDENTIFIER," "REGISTERED MODEL NO.," "SHORTCUT ASSOCIATED," "MOTION DATA (MOTION NO.)," "COMMAND DATA (COMMAND NO.)," and "SHORTCUT AREA," are shown. In a column of item "NO.," numbers beginning with one are shown. In a column of "IDENTIFIER," two identifiers "0001" and "0002" are shown, which are an identifier of communication device 10a and an identifier of communication device 10b, respectively. In the column of "REGISTERED MODEL NO.," a model number "X-001" of TV 5 and a model number "Y-001" of air-conditioner 4 are shown. In the column of "SHORTCUT ASSOCIATED," motion numbers "motion 1" and "motion 2," and command numbers "command 1" to "command 5" are shown. A motion number is a number associated with motion data, and a command number is a number associated with command data. Motion data associated with a motion number is shown in the column of "MOTION DATA (MOTION NO.)," and command data associated with a command number is shown in the column of "COMMAND DATA (COMMAND NO.)." In the example chart, a motion name is shown as motion data for convenience of explanation; however, actually, movement signals and items of time data are stored in the DB as motion data. Also, in the example chart, only a command name is shown as command data; however, data on an instruction signal is also stored in the DB, as shown in FIG. 7. In the column of "SHORTCUT AREA," a name of a captured image including a shortcut area, and coordinates of the shortcut area in the captured image are shown.

As described in the foregoing, storage unit 220 of storage device 20 serves as an identifier storage means for storing identifier data, data on a path indicated by motion data, and data on an instruction signal indicated by command data in association with each other. The path is a route along which moving device 40 moves to a destination, as described above. A destination depends on a path. Accordingly, in other words, the identifier storage means stores identifier data, data on a destination, and data on an instruction signal in association with each other. It is to be noted that the shortcut DB may store motion data and data on a motion name indicating a destination in association with each other.

At step S102, storage device 20 extracts, in the present example, 40 types of motion data and command data, which are numbered from 1 to 40, corresponding to identifier "0001" of user A. Subsequently, storage device 20 performs processing similar to that of step S84 shown in FIG. 16, to determine whether a captured image represented by image data sent from communication device 10a matches a captured image data represented by image data stored in storage unit 220 (step S103). In the present example, it is assumed that the former captured image matches captured image C0. Storage device 20 sends, to communication device 10a, data indicating a shortcut area of captured image C0, and motion data and command data associated with the shortcut area (step S104). Communication device 10a displays the shortcut area (for example, a boundary of the shortcut area) indicated by the data sent from storage device 20 on display surface 153 (step S105). In the present example, it is assumed that a shortcut area associated with motion data "MOVE TO TV FRONT" and a shortcut area associated with motion data "MOVE TO A/C FRONT" are displayed. If a user selects one of the shortcut areas, communication device 10a performs processing of steps S85 and S86 to send the selected motion data to instruction device 30a. Subsequently, processing of step S87, and processing of steps S88 and S89 (not shown in FIG. 22) are carried out so that a moving operation indicated by the selected motion data is performed.

In a case where a shortcut operation processing is carried out by communication device 10b, storage device 20 extracts motion data and command data corresponding to identifier "0002" of user B at step S102. In the present example, storage device 20 extracts 10 types of motion data and command data, which are numbered from 41 to 50, and sends, to communication device 10b, data among the extracted data, which is associated with a shortcut area of a captured image identified at step S103. As described in the foregoing, control unit 210 of storage device 20 serves as a notifying means, which in response to a notice of an identifier from a communication device, notifies the communication device of a path (or a destination) indicated by motion data stored in storage unit 220 in association with the identifier, and an instruction signal indicated by command data stored in storage unit 220 in association with the identifier. Control unit 110 of communication device 10a makes a first request to ask instruction device 30a to cause moving device 40 to move to a destination along a path indicated by motion data sent from storage device 20, and also makes a second request to ask instruction device 30a to send an instruction signal indicated by command data sent from storage device 20. According to the present embodiment, the remote instruction system enables a user carrying a communication device to provide an instruction for only an operation indicated by motion data or command data associated with the user or the communication device. In other words, the remote instruction system is able to limit operations for which a user may provide an instruction.

[Summary of Embodiments]

In the above embodiments, control unit 110 of communication device 10 provides functions described below, by executing a program.

FIG. 24 is a block diagram showing functions provided by control unit 110. Control unit 110 includes display control unit 111, storage control unit 112, request sending unit 113, and specifying unit 114. Display control unit 111 serves as a display control means by performing a processing of step S63 of FIG. 14 or step S83 of FIG. 16 or 19, which displays an image sent from an instruction device on display surface 153 of display unit 151. Display control unit 111 also serves as a display means by cooperating with display unit 151, which displays the image on display surface 153. Display control unit 111 provides image data representing the displayed image to request sending unit 113.

Storage control unit 112 serves a storage control means by performing a processing of step S67 of FIG. 14, which stores, in storage unit 120, image data representing an image such as captured image C0, data indicating a shortcut area such as area E1 included in the image, and at least one of request data representing the above-mentioned first request and request data representing the above-mentioned second request, in association with each other. Storage control unit 112 also serves as an operation storage means by cooperating with storage unit 120, which stores the data as described above. Storage control unit 112 provides the data stored in the storage means to request sending unit 113. Request sending unit 113 serves as a request sending means that in a case where image data representing an image displayed on display surface 153 when a position is detected by touch sensor 152 is stored in storage unit 120, and the detected position is included in a shortcut area associated with the image, sends, to an instruction device, request data representing a request stored in storage unit 120 in association with the shortcut area. Specifying unit 114 is not used in the above embodiments; therefore, the unit is shown by a line made up of dashes in FIG. 24. Specifying unit 114 will be described later.

MODIFICATIONS

The above embodiments are merely examples, and may be modified as described below. The above embodiments and the following modifications may be combined with each other.

Modification 1

In the above embodiment, where a control unit of a communication device associates a shortcut area with either motion data or command data, the control unit may associate a shortcut area with both motion data and command data. For example, the control unit may associate area E1 with both motion data having a motion name "MOVE TO TV FRONT," and command data indicating a command "TV POWER ON/OFF." By making the association, a user is able to turn on a TV by only selecting area E1, in a case where the user knows that the TV is set at power off, and wishes to turn the TV to power on. It may be that the number of items of data to be associated with a shortcut area is three or more. In summary, the control unit may associate a shortcut area with one or more items of motion data or command data.

Modification 2

In the above embodiments, where a control unit of a communication device stores motion data for causing a moving device to move from position B0 or motion data for causing a moving device to come back to position B0, the control unit may store motion data representing other moving operation. For example, the control unit may store motion data representing an operation of a moving device that moves from position B5 to position B4, in which case the control unit may associate the motion data with a shortcut area selected by a user in an image captured at position B5. By making the association, when a user wishes to confirm conditions of both the TV and the air-conditioner, s/he is able to cause a moving device, which has moved to position B5 facing the TV, to move from position B5 to position B4 by only selecting the shortcut area. In contrast, in a case where position B0 is set as a destination or a starting point of movement, after a moving device has been moved to position B5 facing the TV, an operation for causing the moving device to come back to position B0 and an operation for causing the moving device to move from position B0 to position B4 are necessary. According to the present modification, a user is able to provide an operational instruction to a moving device by a smaller number of input operations, as compared with a case where a certain position is always set as a destination or a starting point of movement.

Modification 3

A destination to which a moving device is moved is not limited to a position adjacent to an appliance to be controlled. A destination may be other positions including a position near a bleeding area for a pet or a position near a window. When the modification is employed, a user is able to determine whether to turn on air-conditioner, after confirming a condition of a pet or how much sunlight is coming in from a window. In general terms, in a remote instruction system, motion data may be stored in a communication device, indicating an operation of a moving device that moves to a position where an instruction device is able to capture an image of a position inside a room, with reference to which a determination as to how an appliance to be controlled should operate is made. According to the remote instruction system, a user is able to remotely operate plural appliances installed in different places after confirming a situation surrounding each appliance.

In a remote instruction system, instead of performing the above-mentioned motion operation processing, a user may operate a communication to move a moving device to a destination. The user, after moving the moving device to the destination, may perform an input operation to display a list of command names indicated by command data stored in the communication device. Subsequently, the user selects, with reference to an image being currently captured, a command name of a command to be performed, which is displayed by the communication device. An instruction device causes an appliance to be controlled to perform an operation indicated by the selected command name. When communication between the communication device and the instruction device is terminated by a user's input operation, the instruction device moves to an original position by doubling back the tracked path, so that the moving device and the instruction device return to the initial state. According to the forgoing processing, in the remote instruction system, in a case where data on an operation for movement to a certain position is not stored in the communication device, a user is able to remotely operate an appliance to be controlled after confirming a condition at the certain position.

Modification 4

In a remote instruction system, a motion or command may be performed depending on a position of a communication device. For example, a motion or command to be performed when a shortcut area is selected may be different depending on whether a communication device is located indoors (or whether a communication is located outdoors). In the present modification, a control unit of a communication device stores two items of command data or motion data (one is for indoor use, and the other is for outdoor use) in the above-mentioned first and second command storage processing, and motion storage processing. The control unit also associates the two items of command data or motion data with a shortcut area in a shortcut association processing. The communication device includes positioning unit 160 indicated by a dashed line in FIG. 2. Positioning unit 160 is a means for identifying a position of communication device 10 using, for example, the GPS (Global Positioning System) technology. Specifically, positioning unit 160 measures a latitude and longitude of communication device 10. The above position is identified based on a measured latitude and longitude. Positioning unit 160 provides data on a measured latitude and longitude to control unit 110.

Figure 25:
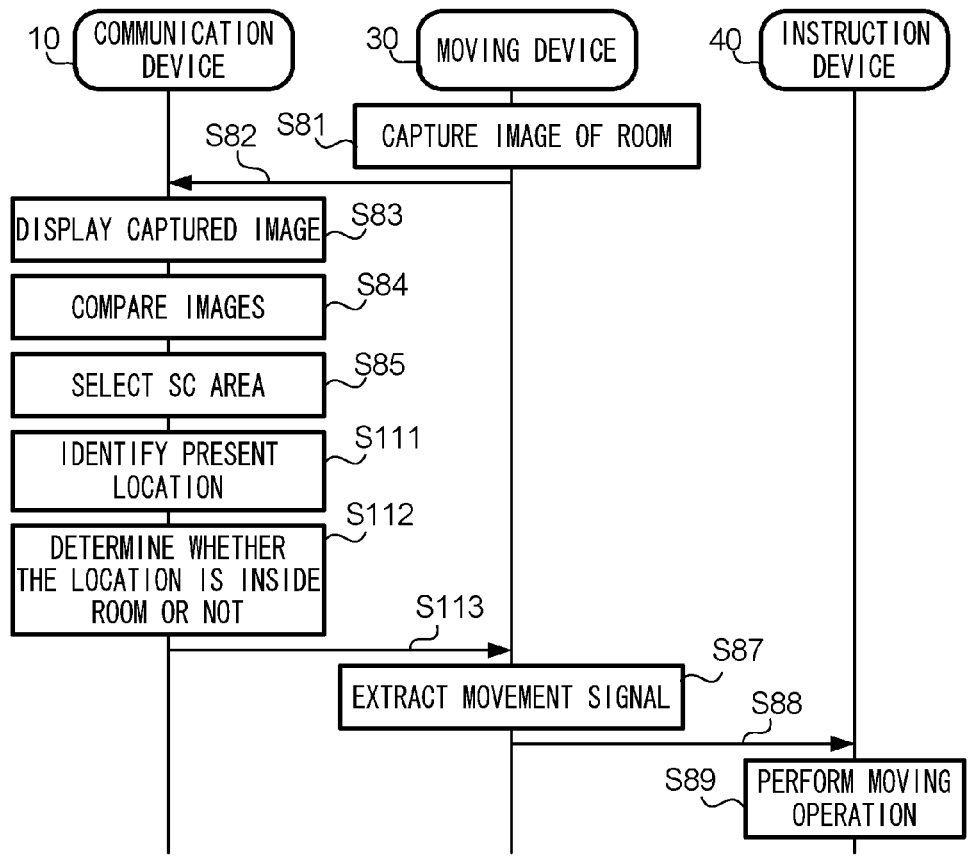
FIG. 25 is a sequence chart showing a procedure of a shortcut operation processing according to a modification.

FIG. 25 is a sequence chart showing a procedure of a shortcut operation processing according to the present modification. In the shortcut operation processing, processing of steps S81 to S85 is shared with the motion operation processing shown in FIG. 16. When a shortcut area is selected at step S85, communication device 10 identifies a position of the device based on a latitude and longitude measured by positioning unit 160 (step S111). Subsequently, communication device 10 determines whether the identified position is inside the room (or outside the room) (step S112). For example, communication device 10 stores, in storage unit 120, data on a location of space A3 inside room 3 shown in FIG. 10 such as latitudes and longitudes of the four corners of space A3 shown in FIG. 10. Communication device 10, if the latitude and longitude of the position identified at step S111 is included in a range defined by the latitudes and longitudes, determines that communication device 10 is located indoors, and if the latitude and longitude of the position identified at step S111 is not included in a range defined by the latitudes and longitudes, determines that communication device 10 is located outdoors. If communication device 10 determines that the device is located indoors, the device sends motion data or command data stored for indoor use to instruction device 30, and if determining that the device is located outdoors, sends motion data or command data stored for outdoor use to instruction device 30 (step S113). The subsequent steps S87 to S89 are shared with the motion operation processing shown in FIG. 16.

In the above example, a shortcut area is associated with one item of motion data or command data; however, a shortcut area may be associated with plural items of motion data, plural items of command data, or both motion data and command data, as described in modification 1. For example, when the above position of communication device 10 is outside the room, since a user may wish to operate an appliance to be controlled after confirming a condition inside the room, motion data and command data may be separately associated with a shortcut area. On the other hand, when the above position of communication device 10 is inside the room, since a user knows a condition inside the room and may wish to operate an appliance to be controlled by a smaller number of input operations, both motion data and command data may be associated with a shortcut area. Alternatively, when a user is located near room 3, since s/he knows weather around room 3, the user may be enabled to perform an operation for setting an air-conditioner to power on/off by a smaller number of input operations. On the other hand, when a user is away from room 3, and does not know weather around room 3, motion data for confirming a condition inside the room and command data may be separately associated with a shortcut area.

In the case, storage unit 120 stores data on a shortcut area, request data representing a first request, and request data representing a second request in association with each other. The second request asks instruction device 30 to send an instruction signal indicated by command data, which is defined for each range of distance. For example, command data indicating turning up the temperature settings of an air-conditioner is defined for a distance of 0 m (a case where an identified position is within space A3 of room 3), command data indicating turning on/off an air-conditioner is defined for a range of distance from 0 m to 1 km, and no command data is defined for a range of distance of more than 1 km. Control unit 110 of communication device 10, when a distance between space A3 and the above position of communication device 10 is not included in a certain range (for example, in the present example, when the distance is longer than 1 km), sends request data representing a first request, not request data representing a second request, to instruction device 30. Control unit 110, when the distance is included in a certain range (for example, in the present example, when the distance is included in the range of distance from 0 m to 1 km), sends, to instruction device 30, request data representing a first request and request data representing a second request, which asks instruction device 30 to send an instruction signal associated with the range. According to the present modification, an operation performed when a shortcut area is selected may be changed depending on a distance between space A3 and communication device 10 so that in a case where an appliance to be controlled should be operated after a condition around the appliance is confirmed, only a moving operation may be performed, and in a case where the appliance should be operated without the confirmation, both an instruction for movement and an operational instruction to the appliance may be simultaneously provided.

Modification 5

In the above embodiments, a communication device, when determining that a shortcut area has been selected at step S85 shown in FIGS. 16 and 19, causes moving device 40 to move, or causes instruction device 30 to send an instruction signal. The communication device may perform the control on other occasions. For example, as described in modification 3, a communication device may display a list of command names in response to a user's input operation, and cause an appliance to be controlled to perform an operation indicated by the selected command name. Alternatively, a communication device may be provided with a function of recognizing a voice, and may perform processing of step S86 (transmission of motion data and request data) when a recognized user's voice indicates a motion name of motion data stored in storage unit 120. A communication device may perform a similar processing at step S92 where command data is sent. According to the present modification, motion data or command data, which is associated with a shortcut area not displayed on a display surface of a communication device, may be sent to instruction device 30 so that movement of moving device 40 or transmission of an instruction signal by instruction device 30 may be requested. For example, if a communication device is located indoors (namely, a user who operates the communication device is located indoors), as described in modification 4, the user is able to directly confirm a position of a moving device or a condition around a position as described in modification 3. In such a case, the user, without moving the moving device to confirm the position or the condition, is able to cause the moving device to move, or cause instruction device 30 to send an instruction signal to control an operation of an appliance to be controlled.

In the present modification, control unit 110 provides a function of specifying unit 114 by executing a program, which unit is shown by a line made up of dashes line in FIG. 24. Specifying unit 114 serves as a specifying means for specifying at least one of a first request or a second request according to a user's input operation. For example, specifying unit 114, when an indicated position indicated by data provided from a touch sensor is included in an area where a command name is displayed, specifies a second request that asks instruction device 30 to send an instruction signal indicated by command data having the command name. Also, specifying unit 114, when a motion name is recognized by the above-mentioned function of recognizing a voice, specifies a first request that asks instruction device 30 to cause moving device 40 to move based on motion data having the recognized motion name. Specifying unit 114, when both a command name and a motion name are selected through a user's input operation (or when both names are recognized), may specify both a first request and a second request. Specifying unit 114 provides data indicating a selected request to request sending unit 113. Request sending unit 113 sends, to a moving device, data for making a request specified by specifying unit 114 such as data sent at step S86 or S92.

Modification 6

In the above embodiments, where an instruction device and a moving device are separate devices, and they cooperate with each other to serve as a moving device that moves around space A3 at which an appliance to be controlled is installed, the devices may be combined into a single device. In the present modification the integrated device will be referred to as "moving instruction device."

Figure 26:
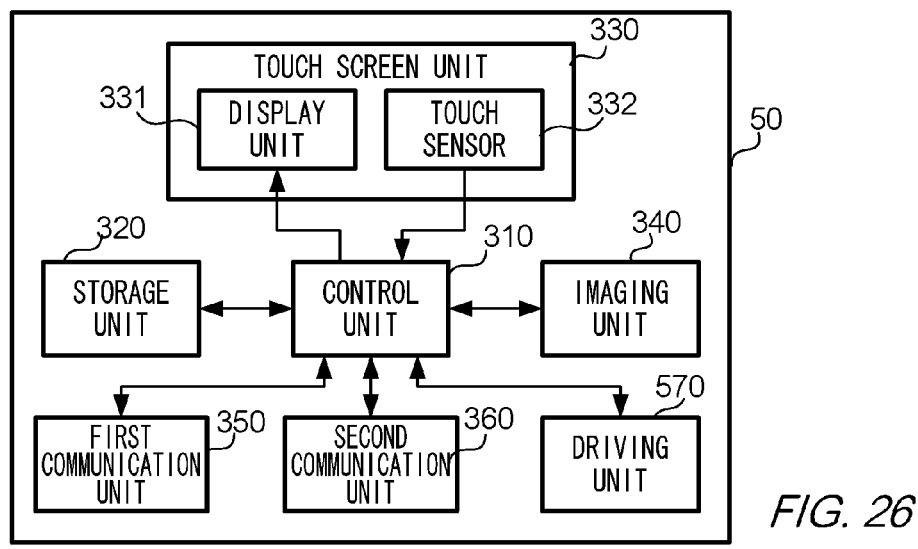
FIG. 26 is a diagram showing a hardware configuration of a moving instruction device according to a modification.

FIG. 26 is a diagram showing a hardware configuration of moving instruction device 50 according to the present modification. Moving instruction device 50 includes control unit 310, storage unit 320, touch screen unit 330, imaging unit 340, first communication unit 350, second communication unit 360, as instruction device 30 shown in FIG. 4 does. Moving instruction device 50 also includes driving unit 570 whose configuration is shared with driving unit 430 shown in FIG. 5, instead of the third communication unit that performs Bluetooth communication. Accordingly, control unit 310 of moving instruction device 50 does not perform Bluetooth communication, and instead controls an operation of driving unit 570. Specifically, moving instruction device 50 does not perform processing of Bluetooth communication such as steps S40 and S45 shown in FIG. 11 and step S88 shown in FIG. 16, and instead perform a moving operation such as steps S42, S46, and S89. Moving instruction device 50 serves as a moving device that moves around space A3.

Modification 7

Control unit 110 of communication device 10 performs a pattern matching at step S84 shown in FIG. 16, by comparing an entire captured image represented by image data stored in storage unit 120 and an entire captured image displayed by display unit 151; however, control unit 110 may perform the pattern matching by comparing portions of the captured images. The captured images are images showing the inside of room 3. One captured image may be different from another in that a table shown is displaced, or that a new object is shown. To enable a decision that two images match in such a case, coordinates of an area, in which arrangement of objects does not change, may be predetermined, and data on the coordinates may be stored in storage unit 120 in association with image data representing a captured image. The coordinates may be of an area around heavy furniture or ceiling of a room (for example, coordinates of upper left and lower right positions in rectangular area E1). Control unit 110, at step S84, performs a pattern matching by comparing areas of images indicated by the coordinates to determine whether the images match. According to the foregoing processing, even if arrangement of objects inside room 3 changes, control unit 110 is likely to determine that two captured images match as long as they are taken from the same position and angle.

Modification 8

Control unit 110 of communication device 10 may determine, at step S84, whether a captured image matches another captured image by using a method other than a pattern matching. For example, control unit 110 may determine whether a captured image matches another captured image based on an execution state of a motion operation processing. The execution state includes a state prior to execution of a motion operation processing and a state subsequent to execution of a motion operation processing. In a case where plural items of motion data are stored, it may be determined with reference to an execution state, based on which motion data a motion operation processing has been performed. For example, in a state where a motion operation processing has not been performed, control unit 110 determines that a captured image on display matches captured image C0 shown in FIG. 12(*a*). In a state where a motion operation processing has been performed for moving moving device 40 to position B5, control unit 110 determines that a captured image on display matches captured image C1 shown in FIG. 12(*d*). According to the foregoing processing, a case is avoided where in a case where arrangement of objects inside room 3 has substantially changed, no captured image matches a captured image on display. In the above-mentioned shortcut association processing, a user is likely to select an area including TV 5 or air-conditioner 4 as a mark. If a position of such an appliance does not change, however arrangement of other objects has changed, a user is able to indicate a shortcut area by referring to the appliance as mark displayed in display surface 153.

Modification 9

In a remote instruction system, a subject for user's remote instruction is not limited to appliances installed inside a room such as room 3 shown in FIG. 1, and may be an appliance installed outdoors. For example, in a remote instruction system, a light installed at a front door, a terrace, or a roof may be turned on or off, or a sprinkler installed at an outdoor home garden may be turned on or off by an instruction signal. When the present modification is employed, moving device 40 is set so that the device is able to move into a space where an instruction signal can reach a receiving unit of an appliance to be controlled.

Modification 10

An instruction device may have a configuration different from that of the above embodiments. For example, an instruction device, instead of sending an instruction signal via infrared communication as described in the above embodiments, may send an instruction signal using other wireless communication methods such as Bluetooth or ZigBee. When other wireless communication methods are employed, an appliance to be controlled is provided with a receiving unit for performing communication using the other wireless communication method. The receiving unit is capable of receiving an instruction signal sent from any direction; however, the unit is not capable of receiving an instruction signal sent from outside a communication range defined by the employed communication method. Accordingly, in the present modification, a moving device moves to a position where an instruction device can communicate with the receiving unit of an appliance to be controlled, and the instruction device sends an instruction to the receiving unit.

An instruction device may not be provided with touch screen unit 330. When an instruction device is not provided with touch screen unit 330, the instruction device sends, to communication device 10, image data representing an image displayed on display unit 331 in the above embodiments, and communication device 10 displays an image represented by the image data on display unit 151. According to the modification, a size and weight of an instruction device is reduced as compared with a case where the device includes touch screen unit 330.

Modification 11

A moving device may have a configuration different from that of the above embodiments. A moving device may be, instead of a device having wheels like a vehicle as described in the above embodiments, a model helicopter, or a robot that walks on two or four legs, or that moves using caterpillar (registered trademark) treads. For example, in a case where in a house with a high hall, lights on the first and second floors are turned on or off, a helicopter or a robot walking up and down stairs may be used as a moving device. A moving device may also be a device that moves on a rail. In essence, a moving device is a device that moves around a space where an appliance to be controlled is installed, and the moving device includes a mechanism by which the device is able to move from a position where the device is set at the initial state to a destination position.

A moving device may include a part of hardware that instruction device 30 has. For example, a moving device may include: a communication unit for wirelessly connecting to communication line 2 as in the case of first communication unit 350 shown in FIG. 4; a communication unit for performing infrared communication with an appliance to be controlled as in the case of second communication unit 360; and an imaging unit. When the modification is employed, an instruction device sends an instruction signal to instruct the communication units and the imaging unit to perform an operation, and the moving device causes the communication units and the imaging unit to perform an operation based on the instruction signal. The moving device may send image data representing an image captured by the imaging unit to the instruction device, or may send the image directly to communication device 10. According to the configuration, an amount of processing performed by instruction device 30 is reduced so that loads on control unit 310 are reduced.

A moving device may be connected to an instruction device through a wire. When the modification is employed, both a moving device and an instruction device include a communication unit having a slot to which a cable connector is inserted. By connecting a moving device and an instruction device via slots in a wired manner, power consumption of the devices is reduced as compared with a case where the devices perform wireless communication. In a case where an instruction device is not able to perform wireless communication with both communication device 10 and a moving device due to a functional limitation, by performing communication with the moving device in a wired manner, the instruction device is able to operate as instruction device 30 does in the above embodiments.

Modification 12

Communication device 10 may carry out a processing of step S34 for acquiring a motion name shown in FIG. 11 subsequent to step S47 or S48. When the modification is employed, communication device 10, at step S35, requests instruction device 30 to start recording motion data. Subsequently, communication device 10, after motion data B0B5 is sent from instruction device 30 at step S47, carries out a processing of step S34 to acquire a motion name. After that, communication device 10 stores data on the acquired motion name and motion data B0B5 in storage unit 120 in association with each other (step S48). By performing the foregoing processing, in a case where image D9 shown in FIG. 13, which shows a character string "RECORD THE MOTION," has been selected, communication device 10 acquires a motion name, and in a case where image D10, which shows a character string "NOT RECORD," has been selected, communication device 10 does not acquire a motion name. Accordingly, a case is avoided where when image D10 has been selected by a user not to record motion data, an unnecessary motion name remains in storage unit 120, so that communication device 10 does not have to perform a processing for deleting the motion name.

Modification 13

The present invention may be embodied as, instead of a remote instruction system, a communication device, a control unit of a communication device, or a method for realizing a processing carried out by the control unit. The present invention may also be embodied as a program for causing a control unit (or a computer) of a communication device to provide the functions shown in FIG. 24. The program may be provided in the form of a recording medium such as an optical disk. Alternatively, the program may be downloaded to a computer via a network such as the Internet, and installed in the computer so that the program can be used.

What is claimed is:

1. A remote control system, comprising:
a relay device capable of moving from one place to another in a space where an appliance to be controlled is installed; and
a communication device that is operated by a user, and communicates with the relay device, wherein:
the relay device includes:
a computer processor that controls movement of the relay device according to a request from communication device;
a camera that captures an image;
a first transmitter that sends an image captured by the camera to the communication device; and
a second transmitter that wirelessly sends, according to a request from the communication device, an instruction signal to instruct the appliance to be controlled to perform an operation; and
the communication device includes:
a memory that stores data on an image of the space captured in advance, data on an image area included in the image, and data on at least one of a first request that requests the relay device to move to a destination located in the space, and a second request that requests the relay device to send the instruction signal, in association with each other;
a display that displays the image sent from the first transmitter on a display surface;
a sensor that detects a position indicated by the user on the display surface; and
a transmitter that, on detecting that an image displayed on the display surface when the position is detected by the sensor is the image stored in the memory, and that the detected position is included in the image area associated with the stored image, sends, to the relay device, the first or second request stored in the memory in association with the image area including the detected position.

2. The remote control system according to claim 1, further comprising a database, wherein:
the transmitter of the communication device further provides a notification of an identifier that identifies the communication device or a user of the communication device;
the database stores plural sets of data on an identifier, data on a destination, and data on an instruction signal, and in response to a notification from the communication device of the identifier, notifies the communication device of a destination and an instruction signal, which are associated with the identifier; and
the the transmitter of the communication device sends, to the relay device, the first request specifying the destination notified by the database, or the second request specifying the instruction signal notified by the database.

3. The remote control system according to claim 1, wherein:
the memory stores data on the image area, data on the first request, and data on the second request in association with each other;
the transmitter of the communication device sends, to the relay device, the first request and the second request, which are associated with the image area;
the computer processor controls movement of the relay device according to the first request received from the communication device; and
the second transmitter, after the control by the computer processor is performed, sends the instruction signal according to the second request received from the communication device.

4. The remote control system according to claim 3, wherein:
The memory stores data on the image area, data on the first request, and data on the second request in association with each other, the second request being a request that asks the second transmitter to send an instruction signal, which is defined for each of a plurality of ranges of distance;
the communication device further includes a locator that identifies a position of the communication device;
the transmitter of the communication device, on detecting that a distance between the space and the positioned identified by the locator is not included in the ranges, sends the first request to the relay device, and on detecting that the distance is included in one of the ranges, sends, to the relay device, the first request and the second request specifying an instruction signal defined according to the distance;
the computer processor controls movement of the relay device according to the first request received from the communication device; and
the second transmitter, after the control by the computer processor is performed, sends the instruction signal according to the second request received from the communication device.

5. The remote control system according to claim 1, wherein the communication device further comprises a computer processor that specifies at least one of the first request and the second request according to a user's input operation, wherein the second transmitter sends the first and/or second request specified by the computer processor of the communication device to the relay device.

6. A remote control method, comprising the steps of:
capturing an image by a relay device capable of moving from one place to another in a space where an appliance to be controlled is installed;
sending an image of the space by the relay device to a communication device that includes a display for displaying an image on a display surface, that is operated by a user, that communicates with the relay device, and that includes a memory, wherein the memory stores data on an image of the space captured in advance, data on an image area included in the image, and data on at least one of a first request that requests the relay device to move to a destination located in the space, and a second request that requests the relay device to send the instruction signal to instruct the appliance to be controlled to perform an operation, in association with each other;
displaying the image received from the relay device on the display surface;
detecting a position indicated by the user on the display surface;
on detecting that an image displayed on the display surface when the indicated position is detected is the image stored in the memory, and that the detected position is included in the image area associated with the stored image, sending by the communication device to the relay device the first or second request stored in the memory in association with the image area including the detected position; and moving the relay device or wirelessly sending the instruction signal according to the first or second request received from the communication device.

7. A communication device comprising:

a transmitter/receiver that communicates with a relay device capable of moving from one place to another in a space where an appliance to be controlled is installed;

a memory that stores data on an image of the space captured in advance, data on an image area included in the image, and data on at least one of a first request that requests the relay device to move to a destination located in the space, and a second request that requests the relay device to send the instruction signal to instruct the appliance to be controlled to perform an operation, in association with each other;

a display that displays the image received by the transmitter/receiver on a display surface;

a sensor that detects a position indicated by a user on the display surface; and a transmitter that on detecting that an image displayed on the display surface when the position is detected by the sensor is the image stored in the memory, and that the detected position is included in the image area associated with the stored image, sends, to the relay device, the first or second request stored in the memory in association with the image area including the detected position.

8. A program stored on a non-transitory computer readable medium, the program for causing a computer to execute the steps of:

displaying, on a display surface of a display, an image received from a relay device capable of moving from one place to another in a space where an appliance to be controlled is installed;

storing, in a memory, data on an image of the space captured in advance, data on an image area included in the image, and data on at least one of a first request that requests the relay device to move to a destination located in the space, and a second request that requests the relay device to send an instruction signal, in association with each other; and on detecting that an image displayed on the display surface when a position indicated by a user on the display surface is detected is the image stored in the memory, and that the detected position is included in the image area associated with the stored image, sending, to the relay device, the first or second request stored in the memory in association with the image area including the detected position.

* * * * *